(12) United States Patent
Zhang et al.

(10) Patent No.: US 12,150,155 B2
(45) Date of Patent: Nov. 19, 2024

(54) RESOURCE INDICATION METHOD AND APPARATUS

(71) Applicant: HUAWEI TECHNOLOGIES CO., LTD., Guangdong (CN)

(72) Inventors: Di Zhang, Shenzhen (CN); Kunpeng Liu, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 635 days.

(21) Appl. No.: 17/370,506

(22) Filed: Jul. 8, 2021

(65) Prior Publication Data

US 2021/0337549 A1 Oct. 28, 2021

Related U.S. Application Data

(63) Continuation of application No. PCT/CN2020/071484, filed on Jan. 10, 2020.

(30) Foreign Application Priority Data

Jan. 10, 2019 (CN) .......................... 201910024796.7
Sep. 17, 2019 (CN) .......................... 201910877804.2

(51) Int. Cl.
*H04W 72/541* (2023.01)
*H04L 5/00* (2006.01)

(52) U.S. Cl.
CPC ......... *H04W 72/541* (2023.01); *H04L 5/0048* (2013.01); *H04L 5/0053* (2013.01)

(58) Field of Classification Search
CPC ........... H04W 72/541; H04W 52/0245; H04W 52/0238; H04W 52/0254; H04W 52/028;
(Continued)

(56) References Cited

U.S. PATENT DOCUMENTS

2015/0162966 A1* 6/2015 Kim ...................... H04L 5/0057
370/252
2015/0230259 A1 8/2015 Park et al.
(Continued)

FOREIGN PATENT DOCUMENTS

CN  102448088 A  5/2012
CN  102684835 A  9/2012
(Continued)

OTHER PUBLICATIONS

Gao et al., "Standardization Progress of Massive MIMO," Journal of CAEIT, Feb. 2018, 13(1):18-22, 71.
(Continued)

*Primary Examiner* — Ricky Q Ngo
*Assistant Examiner* — David M Kayal
(74) *Attorney, Agent, or Firm* — Fish & Richardson P.C.

(57) ABSTRACT

The present disclosure relates to resource indication methods and apparatus. In one example method, a network device configures resource configuration information for a terminal device. The terminal device determines channel state information based on the resource configuration information, and sends the channel state information. The resource configuration information is used to indicate a first reference signal resource set, L second reference signal resource sets, and a type of the first reference signal resource set. The first reference signal resource set includes resources for M first reference signals, and a resource for one of the M first reference signals is used to measure a channel.

22 Claims, 12 Drawing Sheets

(58) Field of Classification Search
CPC ... H04W 24/10; H04W 72/046; H04W 72/23; H04L 5/0048; H04L 5/0053; H04L 5/0094; H04L 5/0023; H04L 5/0062; Y02D 30/70; H04B 7/088; H04B 7/0695; H04B 7/0626

See application file for complete search history.

(56) References Cited

U.S. PATENT DOCUMENTS

| | | | | |
|---|---|---|---|---|
| 2019/0207722 | A1* | 7/2019 | Gao | H04B 7/088 |
| 2019/0261329 | A1* | 8/2019 | Park | H04L 5/0048 |
| 2019/0312668 | A1* | 10/2019 | Park | H04L 5/0057 |
| 2020/0153581 | A1* | 5/2020 | Tsai | H04W 24/10 |
| 2021/0400649 | A1* | 12/2021 | Kang | H04B 7/0695 |

FOREIGN PATENT DOCUMENTS

| | | |
|---|---|---|
| CN | 104428998 A | 3/2015 |
| CN | 106134111 A | 11/2016 |
| CN | 107241129 A | 10/2017 |
| CN | 107241748 A | 10/2017 |
| CN | 108112074 A | 6/2018 |
| CN | 108282285 A | 7/2018 |
| CN | 108282321 A | 7/2018 |
| CN | 108418667 A | 8/2018 |
| WO | 2018021867 A1 | 2/2018 |

OTHER PUBLICATIONS

3GPP TS 38.214 V15.3.0 (Sep. 2018), "3rd Generation Partnership Project; Technical Specification Group Radio Access Network; NR; Physical layer procedures for data (Release 15)," Sep. 2018, 96 pages.

Qualcomm Incorporated, "Maintenance for CSI Measurement," 3GPP TSG RAN WG1 Meeting #92bis, R1-1805521, Apr. 16-20, 2018, Sanya, China, 11 pages.

3GPP TS 38.215 V15.3.0 (Sep. 2018), "3rd Generation Partnership Project; Technical Specification Group Radio Access Network; NR; Physical layer measurements (Release 15)," Sep. 2018, 15 pages.

3GPP TS 38.331 V15.3.0 (Sep. 2018), "3rd Generation Partnership Project; Technical Specification Group Radio Access Network; NR; Radio Resource Control (RRC) protocol specification (Release 15)," Sep. 2018, 445 pages.

Office Action in Chinese Application No. 201910877804.2, dated Jun. 11, 2021, 17 pages PCT International Search Report and Written Opinion in International Application No. PCT/CN2020/071484, dated Apr. 9, 2020, 15 pages.

Extended European Search Report issued in European Application No. 20738616.0 on Feb. 7, 2022, 9 pages.

ZTE, "Feature lead summary on CSI measurement," 3GPP TSG RAN WG1 Meeting #94, R1-1809771, Gothenburg, Sweden, Aug. 20-24, 2018, 18 pages.

Intel Corporation, "Remaining Issues on Interference Measurement for CSI," 3GPP TSG RAN WG1 Meeting #92bis, R1-1804712, Sanya, China, Apr. 16-20, 2018, 5 pages.

Intel Corporation, "Remaining Issues on Interference Measurement for CSI," 3GPP TSG-RAN WG1 Meeting AH 1801, R1-1800309, Vancouver, Canada, Jan. 22-26, 2018, 4 pages.

Huawei, HiSilicon, "Overview of the CSI configuration framework," 3GPP TSG RAN WG2 Meeting #101, R2-1803705, Athens, Greece, Feb. 26-Mar. 22, 2018, 9 pages.

Office Action issued in Chinese Application No. 201910877804.2 on Dec. 8, 2021, 7 pages.

ZTE, "Enhancements on multi-beam operation," 3GPP TSG RAN WG1 Meeting #98bis, R1-1910285, Chongqing, China, Oct. 14-20, 2019, 24 pages.

* cited by examiner (a)

(b)

(a)

(b)

RESOURCE INDICATION METHOD AND APPARATUS

CROSS-REFERENCE TO RELATED APPLICATIONS

This application is a continuation of International Application No. PCT/CN2020/071484, filed on Jan. 10, 2020, which claims priority to Chinese Patent Application No. 201910024796.7, filed on Jan. 10, 2019 and Chinese Patent Application No. 201910877804.2, filed on Sep. 17, 2019. All of the aforementioned patent applications are hereby incorporated by reference in their entireties.

TECHNICAL FIELD

Embodiments of this application relate to the communication field, and in particular, to a resource indication method and apparatus.

BACKGROUND

To cope with explosive mobile data traffic growth, massive mobile communication device connections, and emerging various new services and application scenarios in the future, a fifth veneration (the fifth generation, 5G) mobile communication system emerges. The 5G mobile communication system is also referred to as a new radio access technology (new radio access technology, NR) system.

In the NR system, a signal transmission mechanism based on a beamforming technology is introduced. To be specific, a signal transmit power is increased by increasing an antenna gain, to compensate for a path loss of a radio signal in a process of transmitting the radio signal between a network device and a terminal device by using a high frequency band. However, after a user moves, a direction of a shaped beam corresponding to the radio signal may no longer match a location that is of the user and that is obtained after the user moves. Consequently, a received signal is frequently interrupted. To monitor a change of the shaped beam in the process of transmitting the radio signal, the terminal device measures communication quality of a plurality of beams namely, reference signals) configured by the network device, and reports information about a beam of relatively good communication quality to the network device. Considering that a beam is affected by an interference factor, to select a beam of better communication quality, the terminal device may be enabled to measure interference in a corresponding beam. Therefore, how to configure, for the terminal device, an interference measurement resource used to measure interference is an urgent problem to be resolved.

SUMMARY

Embodiments of this application provide a resource indication method and apparatus, to resolve a problem of how to configure, for a terminal device, a resource used to measure interference.

To achieve the foregoing objective, the following technical solutions are used in the embodiments of this application.

According to a first aspect, an embodiment of this application provides a resource indication method. The method may be applied to a terminal device, or the method may be applied to a communication apparatus that can support a terminal device in implementing the method. For example, the communication apparatus includes a chip system. The method includes: after the terminal device receives resource configuration information, the terminal device may determine channel state information based on the resource configuration information, and send the channel state information. The resource configuration information is used to indicate a first reference signal resource set and L second reference signal resource sets. The first reference signal resource set includes resources for M first reference signals. The resource for the first reference signal is used to measure a channel. An $i^{th}$ second reference signal resource set includes resources for $N_i$ second reference signals. The resource for the second reference signal is used to measure interference. M is an integer greater than 1, L is an integer greater than or equal to 1, i is an integer greater than or equal to 1 and less than or equal to L, and $N_i$ is an integer greater than or equal to 1. According to the resource indication method provided in this embodiment of this application, an interference measurement resource used to measure interference can be configured for the terminal device, so that the terminal device can measure interference in a corresponding beam, and select a reference signal resource of better communication quality.

In some embodiments, the resource that is for the second reference signal and that corresponds to the resource for the $j^{th}$ first reference signal is determined based on the type of the first reference signal resource set.

With reference to the first aspect, in a first possible implementation, a resource that is for a second reference signal and that corresponds to a resource for a $j^{th}$ first reference signal is a resource that is for a second reference signal and that meets a quasi co-location (Quasi-collocation, QCL) relationship with the resource for the $j^{th}$ first reference signal.

With reference to the first aspect, in a second possible implementation, a resource that is for a second reference signal and that corresponds to a resource for a $j^{th}$ first reference signal is a resource that is for a second reference signal and that is reported by the terminal device and meets a QCL relationship with the resource for the $j^{th}$ first reference signal.

With reference to the first aspect and the foregoing possible implementations, in a third possible implementation, the type of the first reference signal resource set includes a first type and a second type, the first type is used to indicate that the M first reference signals use different downlink spatial transmission filters, and the second type is used to indicate that the M first reference signals use a same downlink spatial transmission filter.

For different types of first reference signal resource sets, a correspondence between the resource for the $j^{th}$ first reference signal and the resource that is for the second reference signal and that meets the QCL relationship with the resource for the $j^{th}$ first reference signal may be different.

With reference to the first aspect and the foregoing possible implementations, in a fourth possible implementation, the type of the first reference signal resource set is the first type, and the $j^{th}$ first reference signal and a second reference signal in the L second reference signal resource sets meet a QCL relationship.

With reference to the first aspect and the foregoing possible implementations, in a fifth possible implementation, the type of the first reference signal resource set is the second type, the $j^{th}$ first reference signal and a $j^{th}$ second reference signal meet a QCL relationship, the $j^{th}$ second reference signal is a second reference signal on a $j^{th}$ second reference signal resource in the resources that are for the $N_i$ second reference signals and that are included in the $i^{th}$ second reference signal resource set, and $M=N_i$.

With reference to the first aspect and the foregoing possible implementations, in a sixth possible implementation, the type of the first reference signal resource set is the second type, the $j^{th}$ first reference signal and a second reference signal in a $j^{th}$ second reference signal resource set meet a quasi co-location QCL relationship, and M=L.

For a plurality of channel measurement resources (channel measurement resource, CMR) in a beam training process, a network device needs to configure a corresponding interference measurement resource (interference measurement resource, IMR) for each channel measurement resource. However, for a user, a plurality of types of interference need to be considered, for example, inter-cell interference and inter-multi-beam (multi-beam) interference. In this case, a plurality of interference measurement resources need to be configured for the channel measurement resource. In this embodiment of this application. M may be equal to L, or M is not equal to L. For example, M may be greater than L. When the first reference signal resource set is of the first type, the resource for the first reference signal is used for training of a transmit beam on a network device side. A receive beam on a terminal device side is approximately the same. The terminal device may receive the interference resources by using a same receive beam. Therefore, a plurality of channel measurement resources may share a set of the interference measurement resources. For example, the resources for the M first reference signals may share resources for second reference signals in the L second reference signal resource sets. Therefore, resource overheads for configuring the interference resources are effectively reduced.

With reference to the first aspect and the foregoing possible implementations, in a seventh possible implementation, L=1, the resource for the second reference signal is a resource for channel state information-interference measurement (Channel state information interference measurement, CSI-IM), and that the terminal device determines the channel state information based on the resource for the $j^{th}$ first reference signal and the resource that is for the second reference signal and that corresponds to the resource for the $j^{th}$ first reference signal includes: determining a first signal power and a second signal power; and determining the channel state information based on the first signal power and the second signal power. The first signal power is acquired based on a signal power of the $j^{th}$ first reference signal, and the second signal power is acquired based on an average value of signal powers of CSI-IM on resources that are for second reference signals and that correspond to the resource for the $j^{th}$ first reference signal. For example, the first signal power is the signal power of the $j^{th}$ first reference signal; and/or the second signal power is the average value of the signal powers of the CSI-IM on the resources that are for the second reference signals and that correspond to the resource for the $j^{th}$ first reference signal.

With reference to the first aspect and the foregoing possible implementations, in an eighth possible implementation, L=I, the resource for the second reference signal is a resource for a non zero power-channel state information reference signal (Non Zero Power Channel State Information Reference Signal, NZP-CSI-RS), and that the terminal device determines the channel state information based on the resource for the $j^{th}$ first reference signal and the resource that is for the second reference signal and that corresponds to the resource for the $j^{th}$ first reference signal includes: determining a first signal power and a second signal power; and determining the channel state information based on the first signal power and the second signal power. The first signal power is acquired based on a signal power of the $j^{th}$ first reference signal, and the second signal power is acquired based on a sum of signal powers of NZP-CSI-RSs on resources that are for second reference signals and that correspond to the resource for the $j^{th}$ first reference signal. For example, the first signal power is the signal power of the $j^{th}$ first reference signal; and/or the second signal power is the sum of the signal powers of the NZP-CSI-RSs on the resources that are for the second reference signals and that correspond to the resource for the $j^{th}$ first reference signal.

With reference to the first aspect and the foregoing possible implementations, in a ninth possible implementation, L is greater than 1, resources for second reference signals in the L second reference signal resource sets include a resource for an NZP-CSI-RS and a resource for CSI-IM, and that the terminal device determines the channel state information based on the resource for the $j^{th}$ first reference signal and the resource that is for the second reference signal and that corresponds to the resource for the $j^{th}$ first reference signal includes:

determining a first signal power and a second signal power; and determining the channel state information based on the first signal power and the second signal power, where the first signal power is acquired based on a signal power of the $j^{th}$ first reference signal, and the second signal power is acquired based on a signal power of CSI-IM and a signal power of an NZP-CSI-RS, where the CSI-IM and the NZP-CSI-RS are on resources that are for second reference signals and that correspond to the resource for the $j^{th}$ first reference signal. For example, the first signal power is the signal power of the $j^{th}$ first reference signal; and/or the second signal power is a sum of the signal power of the CSI-IM and the signal power of the NZP-CSI-RS, where the CSI-IM and the NZP-CSI-RS are on the resources that are for the second reference signals and that correspond to the resource for the $j^{th}$ first reference signal.

With reference to the first aspect and the foregoing possible implementations, in a tenth possible implementation, the resource for the first reference signal is a resource for an NZP CSI-RS or a resource for a synchronization signal/physical broadcast channel block (synchronous signal/PBCH block, SSB).

According to a second aspect, an embodiment of this application provides a resource indication method. The method may be applied to a network device, or the method may be applied to a communication apparatus that can support a network device in implementing the method. For example, the communication apparatus includes a chip system. The method includes: After sending resource configuration information to a terminal device, the network device receives channel state information. The resource configuration information is used to indicate a first reference signal resource set, L second reference signal resource sets, and a type of the first reference signal resource set, the first reference signal resource set includes resources for M first reference signals, the resource for the first reference signal is used to measure a channel, an second reference signal resource set includes resources for $N_i$ second reference signals, the resource for the second reference signal is used to measure interference, M is an integer greater than 1, L is an integer greater than or equal to 1, i is an integer greater than or equal to 1 and less than or equal to L, and $N_i$ is an integer greater than or equal to 1. The channel state information is determined by the terminal device based on a resource for a $j^{th}$ first reference signal and a resource that is for a second reference signal and that corresponds to the resource for the $j^{th}$ first reference signal, the resource that is for the second reference signal and that corresponds to the resource for the $j^{th}$ first reference signal is determined based on the type of the first reference signal resource set, and j is an integer greater than or equal to 1 and less than or equal to M. According to the resource indication method provided in this embodiment of this application, an interference measurement resource used to measure interference can be configured for the terminal device, so that the terminal device can measure interference in a corresponding beam, and select a reference signal resource of better communication quality.

With reference to the second aspect, in a first possible implementation, the resource that is for the second reference signal and that corresponds to the resource for the $j^{th}$ first reference signal is a resource that is for a second reference signal and that meets a QCL, relationship with the resource for the $j^{th}$ first reference signal.

With reference to the second aspect, in a second possible implementation, the resource that is for the second reference signal and that corresponds to the resource for the $j^{th}$ first reference signal is a resource that is received by the terminal device and corresponds to a resource index of a second reference signal and that meets a QCL relationship with the resource for the $j^{th}$ first reference signal.

With reference to the second aspect and the foregoing possible implementations, in a third possible implementation, the type of the first reference signal resource set includes a first type and a second type, the first type is used to indicate that the M first reference signals use different downlink spatial transmission filters, and the second type is used to indicate that the M first reference signals use a same downlink spatial transmission filter.

With reference to the second aspect and the foregoing possible implementations, in a fourth possible implementation, the type of the first reference signal resource set is the first type, and the $j^{th}$ first reference signal and a second reference signal in the L second reference signal resource sets meet a QCL relationship.

With reference to the second aspect and the foregoing possible implementations, in a fifth possible implementation, the type of the first reference signal resource set is the second type, the $j^{th}$ first reference signal and a $j^{th}$ second reference signal meet a QCL relationship, the $j^{th}$ second reference signal is a second reference signal on a $j^{th}$ second reference signal resource in the resources that are for the $N_i$ second reference signals and that are included in the $i^{th}$ second reference signal resource set, and $M=N_i$.

With reference to the second aspect and the foregoing possible implementations, in a sixth possible implementation, the type of the first reference signal resource set is the second type, the $j^{th}$ first reference signal and a second reference signal in a $j^{th}$ second reference signal resource set meet a QCL relationship, and M=L.

In a possible design, a transmission configuration indicator (transmission configuration indicator, WI) state (state) is configured for the resource for the first reference signal in the first reference signal resource set, and TCI states of resources for at least two first reference signals in the first reference signal resource set are different. In other words, the TCI state is configured for the resource for the first reference signal in the first reference signal resource set, and QCL-TypeD (QCL-TypeD) indicated by the TCI states of the resources for the at least two first reference signals in the first reference signal resource set is different. In other words, QCL information is configured for the resource for the first reference signal in the first reference signal resource set, and QCL information of the resources for the at least two first reference signals in the first reference signal resource set is different. The QCL information may be QCL-TypeD (QCL-TypeD) indicated by a TO state. In some embodiments, resources that are for first reference signals and that have same QCL information correspond to a resource for one or more second reference signals. A resource for a first reference signal and a resource for a second reference signal that have a correspondence use same QCL information. Alternatively, it may be described as that the resource for the first reference signal and the resource for the second reference signal that have the correspondence meet a QCL relationship.

In another possible design, K different pieces of QCL information are configured for the resources for the M first reference signals, and K is an integer greater than or equal to 1.

In some embodiments, resources that are for first reference signals and that have same QCL information is grouped into one group, resources for N second reference signals are grouped into K groups in total, and one group of resources for second reference signals correspond to one group of resources for first reference signals.

In another possible design, if resources for N second reference signals are resources for reference signals in one second reference signal resource set, the method further includes: equally dividing the resources for the N second reference signals into K groups based on an order of reference signal resources indicated in the second reference signal resource set.

In another possible design, if resources for N second reference signals are resources for reference signals in K second reference signal resource sets (for example, $w^{th}$ second reference signal resource set corresponds to a resource of a $w^{th}$ group of resources for second reference signals, where w is an integer greater than or equal to 1 and less than or equal to K.

In another possible design, the method further includes: equally dividing N second reference signals into K groups in ascending order of resource indexes of the N second reference signals.

In another possible design, the method further includes: equally dividing N second reference signals into K groups in descending order of resource indexes of the N second reference signals.

It should be noted that "equally dividing" may mean that each second reference signal resource group includes a same quantity of resources for second reference signals.

In another possible design, a type of the second reference signal resource set is the same as the type of the first reference signal resource set; or no type is configured for the second reference signal resource set. In other words, a repetition field of the second reference signal resource set is the same as a repetition field of the type of the first reference signal resource set. Alternatively, no repetition field is configured for the second reference signal resource set.

It should be understood that a type of a reference signal resource set includes the first type and the second type. The first type is used to indicate that reference signals in the reference signal resource set use different downlink spatial transmission filters (spatial domain transmission filter). "Reference signals use different downlink spatial transmission filters" may mean that the terminal device does not assume that a same spatial filter is used. To be specific, at least two reference signals use different spatial transmission filters. The network device may configure a repetition (replication) field of the reference signal resource set to "off" by using higher layer signaling (for example, radio resource control (Radio Resource Control, RRC) signaling), to indicate that the type of the reference signal resource set is the first type. The reference signal resource set of the first type may be a resource set for NZP CSI-RSs. The reference signal resource set of the first type may be used by the terminal device to train a transmit beam on a network device side. The second type is used to indicate that the reference signals in the reference signal resource set use a same downlink spatial transmission filter. The network device may configure a repetition (replication) field of the first reference signal resource set to "on" by using higher layer signaling (for example, RRC signaling), to indicate that the type of the reference signal resource set is the second type. The reference signal resource set of the second type may be used by the terminal device to train a receive beam on a terminal device side.

It should be noted that the type of the reference signal resource set may be configured by the network device, or may be determined by the terminal device based on the resource configuration information. The first type may also be used to indicate that resources for the reference signals in the reference signal resource set use the different downlink spatial transmission filters. The second type may also be used to indicate that the resources for the reference signals in the reference signal resource set use the same downlink spatial transmission filter.

According to a third aspect, an embodiment of this application provides a resource indication method. The method may be applied to a terminal device, or the method may be applied to a communication apparatus that can support a terminal device in implementing the method. For example, the communication apparatus includes a chip system. The method includes: After receiving resource configuration information, the terminal device determines channel state information based on a resource for a $j^{th}$ first reference signal and a resource that is for a second reference signal and that corresponds to the resource for the $j^{th}$ first reference signal, and sends the channel state information. The resource configuration information is used to indicate a first reference signal resource set, L second reference signal resource sets, and information about a spatial correlation parameter, the first reference signal resource set includes resources for M first reference signals, the resource for the first reference signal is used to measure a channel, an $i^{th}$ second reference signal resource set includes resources for $N_i$ second reference signals, the resource for the second reference signal is used to measure interference, M is an integer greater than 1, L is an integer greater than or equal to 1, i is an integer greater than or equal to 1 and less than or equal to L, and $N_i$ is an integer greater than or equal to 1. j is an integer greater than or equal to 1 and less than or equal to M, and the resource that is for the second reference signal and that corresponds to the resource for the $j^{th}$ first reference signal is determined based on the spatial correlation parameter. According to the resource indication method provided in this embodiment of this application, an interference measurement resource used to measure interference can be configured for the terminal device, so that the terminal device can measure interference in a corresponding beam, and select a reference signal resource of better communication quality.

According to a fourth aspect, an embodiment of this application provides a resource indication method. The method may be applied to a network device, or the method may be applied to a communication apparatus that can support a network device in implementing the method. For example, the communication apparatus includes a chip system. The method includes: After sending resource configuration information to a terminal device, the network device receives channel state information. The resource configuration information is used to indicate a first reference signal resource set, L second reference signal resource sets, and information about a spatial correlation parameter, the first reference signal resource set includes resources for M first reference signals, the resource for the first reference signal is used to measure a channel, an $i^{th}$ second reference signal resource set includes resources for $N_i$ second reference signals, the resource for the second reference signal is used to measure interference, M is an integer greater than 1, L is an integer greater than or equal to 1, i is an integer greater than or equal to 1 and less than or equal to L, and $N_i$ is an integer greater than or equal to 1. The channel state information is determined based on a resource for a $j^{th}$ first reference signal and a resource that is for a second reference signal and that corresponds to the resource for the $j^{th}$ first reference signal, the resource that is for the second reference signal and that corresponds to the resource for the $j^{th}$ first reference signal is determined based on the spatial correlation parameter, and j is an integer greater than or equal to 1 and less than or equal to M. According to the resource indication method provided in this embodiment of this application, an interference measurement resource used to measure interference can be configured for the terminal device, so that the terminal device can measure interference in a corresponding beam, and select a reference signal resource of better communication quality.

It should be noted that the information about the spatial correlation parameter includes a transmission configuration indicator state of the first reference signal and a transmission configuration indicator state of a second reference signal; or the information about the spatial correlation parameter includes QCL information of the first reference signal and QCL information of a second reference signal; or the information about the spatial correlation parameter includes quasi co-location QCL information of the first reference signal; or the information about the spatial correlation parameter includes QCL information of a second reference signal.

The resource that is for the second reference signal and that corresponds to the resource for the $j^{th}$ first reference signal may be determined based on a resource that is for a second reference signal and that meets a QCL relationship with the resource for the $j^{th}$ first reference signal, or the resource that is for the second reference signal and that corresponds to the resource for the $j^{th}$ first reference signal may be determined based on a resource that is for a second reference signal and that has a same transmission configuration indicator state as the resource for the $j^{th}$ first reference signal.

According to a fifth aspect, an embodiment of this application further provides a resource indication apparatus, configured to implement the method described in the first aspect or the third aspect. The resource indication apparatus is a terminal device or a communication apparatus that supports the terminal device in implementing the method described in the first aspect. For example, the communication apparatus includes a chip system. For example, the resource indication apparatus includes a receiving unit, a processing unit, and a sending unit. The receiving unit is configured to receive resource configuration information, where the resource configuration information is used to indicate a first reference signal resource set, L second reference signal resource sets, and a type of the first reference signal resource set, the first reference signal resource set includes resources for M first reference signals, the resource for the first reference signal is used to measure a channel, an $i^{th}$ second reference signal resource set includes resources for $N_i$ second reference signals, the resource for the second reference signal is used to measure interference, M is an integer greater than 1, L is an integer greater than or equal to 1, i is an integer greater than or equal to 1 and less than or equal to L, and $N_i$ is an integer greater than or equal to 1. The processing unit is configured to determine channel state information based on a resource for a $j^{th}$ first reference signal and a resource that is for a second reference signal and that corresponds to the resource for the $j^{th}$ first reference signal, where the resource that is for the second reference signal and that corresponds to the resource for the $j^{th}$ first reference signal is determined based on the type of the first reference signal resource set, and j is an integer greater than or equal to 1 and less than or equal to M. The sending unit is configured to send the channel state information.

Optionally, a specific resource indication method is the same as that in the corresponding descriptions in the first aspect or the third aspect. Details are not described herein again.

According to a sixth aspect, an embodiment of this application further provides a resource indication apparatus, configured to implement the method described in the second aspect or the fourth aspect. The resource indication apparatus is a network device or a communication apparatus that supports the network device in implementing the method described in the second aspect or the fourth aspect. For example, the communication apparatus includes a chip system. For example, the communication apparatus includes a sending unit and a receiving unit. The sending unit is configured to send resource configuration information. The receiving unit is configured to receive channel state information.

Optionally, a specific resource indication method is the same as that in the corresponding descriptions in the second aspect or the fourth aspect. Details are not described herein again.

It should be noted that the function modules in the fifth aspect and the sixth aspect may be implemented by hardware, or may be implemented by hardware executing corresponding software. The hardware or software includes one or more modules corresponding, to the functions. For example, a transceiver is confit cured to complete functions of the receiving unit and the sending unit, a processor is configured to complete a function of the processing unit, and a memory is configured to store program instructions used by the processor to perform the methods in the embodiments of this application. The processor, the transceiver, and the memory are connected through a bus and implement mutual communication. Specifically, refer to a function of behavior of the terminal device or the network device in the method according to the first aspect to the method according to the fourth aspect.

According to a seventh aspect, an embodiment of this application further provides a communication apparatus, configured to implement the method described in the first aspect or the third aspect. The communication apparatus is a terminal device or a communication apparatus that supports a terminal device in implementing the method described in the first aspect or the third aspect. For example, the communication apparatus includes a chip system. For example, the communication apparatus includes a processor, configured to implement the functions in the method described in the first aspect or the third aspect. The communication apparatus may further include a memory, configured to store program instructions and data. The memory is coupled to the processor, and the processor may invoke and execute the program instructions stored in the memory, to implement the functions in the method described in the first aspect or the third aspect. The communication apparatus may further include a communication interface, and the communication interface is used by the communication apparatus to communicate with another device. FO example, if the communication apparatus is the terminal device, the another device is a network device.

Optionally, a specific resource configuration method is the same as that in the corresponding descriptions in the first aspect or the third aspect. Details are not described herein again.

According to an eighth aspect, an embodiment of this application further provides a communication apparatus, configured to implement the method described in the second aspect or the fourth aspect. The communication apparatus is a network device or a communication apparatus that supports a network device in implementing the method described in the second aspect or the fourth aspect. For example, the communication apparatus includes a chip system. For example, the communication apparatus includes a processor, configured to implement the functions in the method described in the second aspect or the fourth aspect. The communication apparatus may further include a memory, configured to store program instructions and data. The memory is coupled to the processor, and the processor may invoke and execute the program instructions stored in the memory, to implement the functions in the method described in the second aspect or the fourth aspect. The communication apparatus may further include a communication interface, and the communication interface is used by the communication apparatus to communicate with another device. For example, if the communication apparatus is the network device, the another device is a terminal device. If the communication apparatus is a terminal device, the another device is a network device.

According to a ninth aspect, an embodiment of this application further provides a computer-readable storage medium, including a computer software instruction. When the computer software instruction is run in a communication apparatus, the communication apparatus is enabled to perform the methods according to the first aspect to the fourth aspect.

According to a tenth aspect, an embodiment of this application provides a computer program product including an instruction. When the computer program product runs in a communication apparatus, the communication apparatus is enabled to perform the methods according to the first aspect to the fourth aspect.

According to an eleventh aspect, an embodiment of this application provides a chip system. The chip system includes a processor, and may further include a memory, configured to implement the function of the network device in the foregoing methods. The chip system may include a chip, or may include a chip and another discrete component.

According to a twelfth aspect, an embodiment of this application further provides a communication system. The communication system includes the terminal device described in the fifth aspect or the communication apparatus that supports the terminal device in implementing the method described in the first aspect and the network device described in the sixth aspect or the communication apparatus that supports the network device in implementing the method described in the second aspect.

Alternatively, the communication system includes the terminal device described in the seventh aspect or the communication apparatus that supports the terminal device in implementing the method described in the first aspect and the network device described in the eighth aspect or the communication apparatus that supports the network device in implementing the method described in the second aspect.

Alternatively, the communication system includes the terminal device described in the fifth aspect or the communication apparatus that supports the terminal device in implementing the method described in the third aspect and the network device described in the sixth aspect or the communication apparatus that supports the network device in implementing the method described in the fourth aspect.

Alternatively, the communication system includes the terminal device described in the seventh aspect or the communication apparatus that supports the terminal device in implementing the method described in the third aspect and the network device described in the eighth aspect or the communication apparatus that supports the network device in implementing the method described in the fourth aspect.

In addition, for technical effects brought by the design manners of any one of the foregoing aspects, refer to technical effects brought by different design manners of the first aspect to the fourth aspect. Details are not described herein.

In the embodiments of this application, names of the terminal device, the network device, and the communication apparatus constitute no limitation on the device. During actual implementation, the devices may have other names, provided that functions of the devices are similar to those in the embodiments of this application, and fall within the scope of the claims of this application and the equivalent technologies thereof.

DESCRIPTION OF EMBODIMENTS

Figure 1:
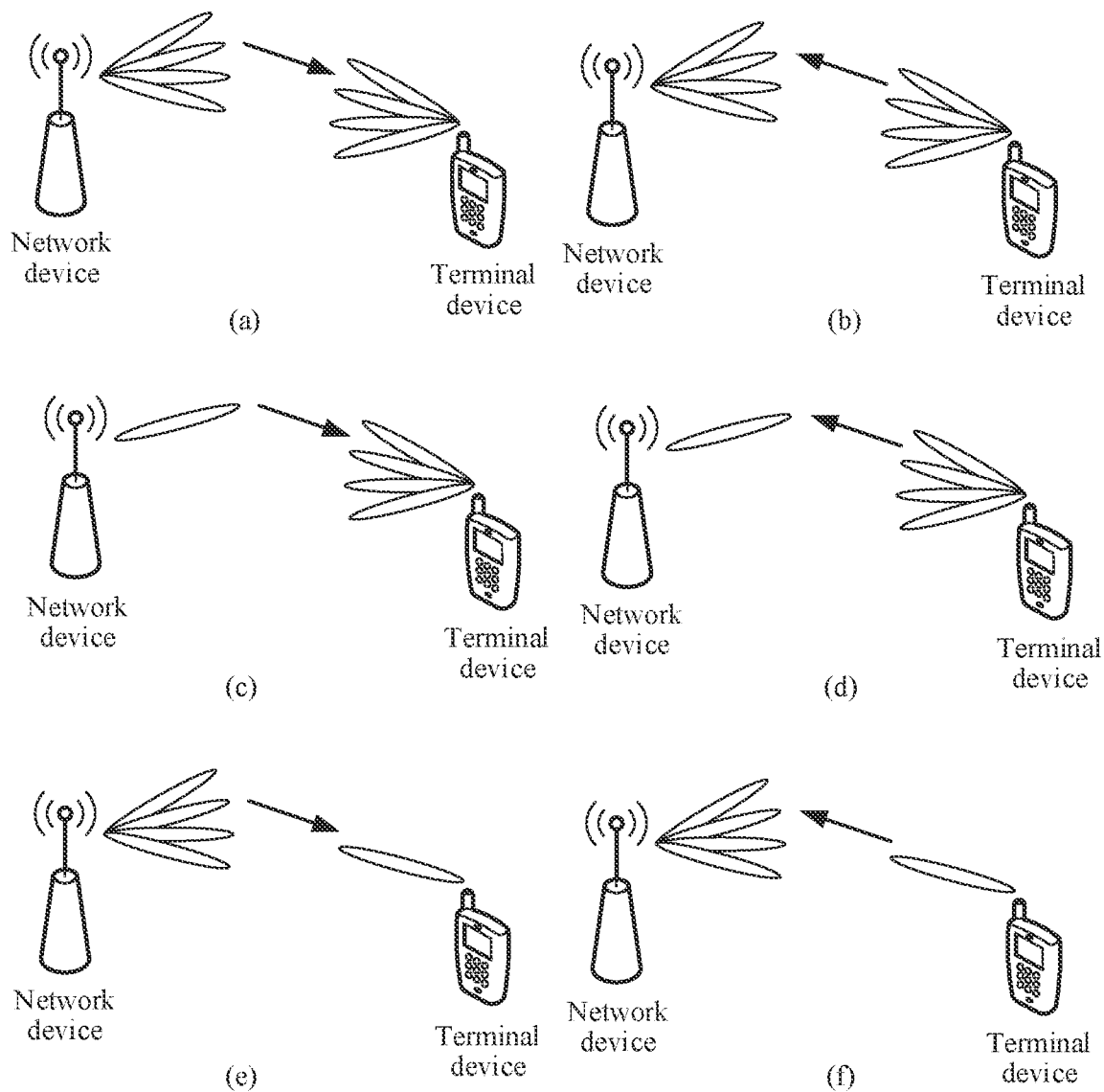
FIG. 1 is an example diagram of beam training according to a conventional technology.

For clear and brief description of the following embodiments, a related technology is briefly described first.

In an NR system, a radio signal may be transmitted between a network device and a terminal device by using a multi-antenna technology. Therefore, signal coverage can be expanded, and communication experience of a user can be improved. In addition, to meet a requirement of the user for a system capacity, the radio signal may be transmitted between the network device and the terminal device based on a high frequency band. When the high frequency band is used to transmit the radio signal, because a frequency is increased, an antenna spacing is reduced. For a same quantity of antennas, an antenna panel of a smaller size may be used compared with that on a low frequency. Therefore, a size of a multi-antenna configuration may be reduced. This facilitates acquisition of a site location of the network device and deployment information of more antennas. However, different from an operating frequency band of a system such as long term evolution (Long Term Evolution, LTE), in a process of transmitting a signal based on the high frequency band, a path loss of the signal is further increased. In particular, factors such as the atmosphere and vegetation aggravate a loss of radio propagation. The path loss (path loss) may also be referred to as a propagation loss. The path loss refers to a loss caused by filtering the signal by air during radio wave propagation in space. The path loss is an amount of a loss introduced by a propagation environment between a transmitter and a receiver. That is, the path loss is caused by radiation diffusion of a transmit power and a propagation characteristic of a channel, and reflects a change of an average value of received signal powers in a macroscopic range. Theoretically, path losses are also the same for same transmit and receive distances. However, during actual application, receive powers at different receive points with same transmit and receive distances change greatly, and even a receive power at a same receive point also fluctuates relatively greatly at different time points.

To compensate for the path loss, a signal transmission mechanism based on a beamforming (Beamforming) technology is introduced. To be specific, a signal transmit power is increased by increasing an antenna gain, to compensate for the path loss in a process of transmitting the radio signal between the network device and the terminal device by using the high frequency band. Beamforming may also be referred to as beamforming and spatial domain filtering. Beamforming is a signal processing technique that uses a sensor array for directional signal transmission and reception. In the beamforming technology, a parameter of a basic unit of a phase array is adjusted, so that signals of some angles acquire constructive interference, and signals of some other angles acquire destructive interference. Beamforming can be used at both a signal transmit end and a signal receive end.

When the radio signal is transmitted based on the beamforming technology, after the user moves, a direction of a shaped beam corresponding to the radio signal may no longer match a location that is of the user and that is obtained after the user moves. Consequently, a received signal is frequently interrupted. To reduce a change of the shaped beam in the process of transmitting the radio signal, before transmitting data, the terminal device may first perform beam training, to select a beam pair (beam pair link, BPL) of relatively good communication quality. One beam pair includes one transmit beam of the network device and one receive beam of the terminal device, or one beam pair includes one transmit beam of the terminal device and one receive beam of the network device. The beam pair may be represented as <Bx, B'x>, where Bx represents the transmit beam of the network device, and B'x represents the receive beam of the terminal device. The beam pair may alternatively be represented as <By, B'y>, where By represents the transmit beam of the terminal device, and B'y represents the receive beam of the network device. Beam alignment may also be referred to as beam training.

Beam alignment may include downlink beam alignment and uplink beam alignment. The downlink beam alignment means that the terminal device selects the transmit beam of the network device and/or the receive beam of the terminal device based on beam sweeping performed by the network device, as shown in (a) in FIG. 1. The uplink beam alignment means that the network device selects the transmit beam of the terminal device and/or the receive beam of the network device based on beam sweeping performed by the terminal device, as shown in (b) in FIG. 1. The beam sweeping refers to a process of sending reference signals by using different transmit beams.

For example, the downlink beam alignment means measuring channel quality of a plurality of beams sent by the network device, to select a beam of relatively good channel quality from the plurality of beams, and reporting channel state information to the network device. The channel state information may include a beam index and a reference signal received power (Reference signal received power, RSRP) of a beam. For example, the terminal device may report the channel state information (Channel State Information, CSI) to the network device by using a physical uplink control channel (Physical Uplink Control Channel, PUCCH) or a physical uplink shared channel (Physical Uplink Shared Channel, PUSCH). The channel state information may also be referred to as beam state information (Beam state information, BSI) or beam indication information. It may be understood that measurement of channel quality of the beam is measurement that is based on a synchronization signal or a cell-specific reference signal acquired through beamforming.

For example, a process of the downlink beam alignment may include: The network device sends one or more reference signals to the terminal device by using each transmit beam, where resource multiplexing (for example, time domain and/or frequency domain resource multiplexing is performed in a manner of time division, frequency division, code division, or a combination thereof) may be performed between reference signals sent by using different transmit beams; the terminal device receives, by using each of a plurality of receive beams, the reference signal sent by each transmit beam of the network device, then estimates, based on the plurality of received reference signals, channel quality from each transmit beam of the network device to each receive beam of the terminal device, determines a beam pair whose channel quality meets a preset condition, and feed backs information (which may also be referred to as beam indication information) that is for indicating a transmit beam and that is in the beam pair to the network device. Subsequently, the network device may send a control channel, a data channel, a sounding signal, or the like by using the transmit beam in the beam pair, and the terminal device may receive, by using a receive beam in the beam pair, the control channel, the data channel, the sounding signal, or the like that is sent by the network device.

Figure 2:
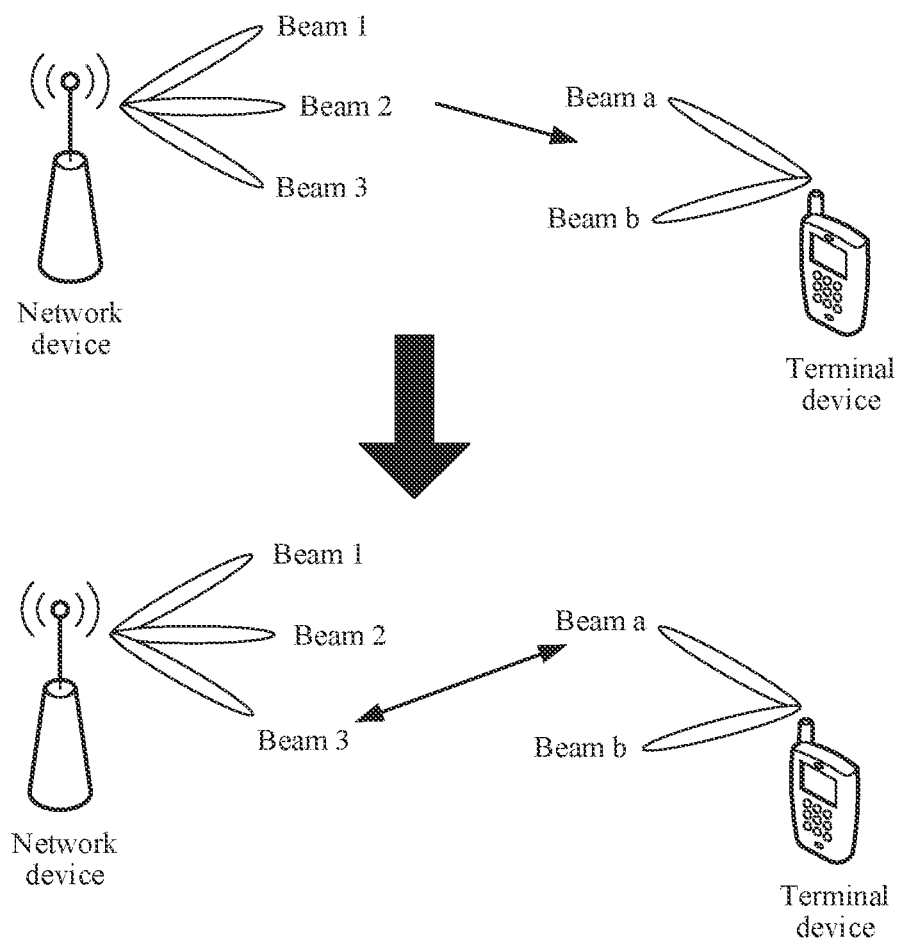
FIG. 2 is another example diagram of beam training according to a conventional technology.

As shown in FIG. 2, it is assumed that the network device may generate three transmit beams, which are respectively marked as a beam 1, a beam 2, and a beam 3; the terminal device may generate two receive beams, which are respectively marked as a beam a and a beam b. In this case, the network device respectively sends a reference signal 1, a reference signal 2, and a reference signal 3 by using the beam 1, the beam 2, and the beam 3; the terminal device receives the reference signal 1, the reference signal 2, and the reference signal 3 by using the beam a, receives the reference signal 1, the reference signal 2, and the reference signal 3 by using the beam b, then determines, based on the received reference signals, beam pairs (to be specific, a beam pair including the beam 1 and the beam a, a beam pair including the beam 2 and the beam a, a beam pair including the beam 3 and the beam a, a beam pair including the beam 1 and the beam b, a beam pair including the beam 2 and the beam b, and a beam pair including the beam 3 and the beam b) for transmitting these reference signals, and determines a beam pair that meets the preset condition. Assuming that the beam pair determined to meet the preset condition is the beam pair including the beam 3 and the beam a, the terminal device may feed back, to the network device, information indicating the beam 3.

For example, a process of the uplink beam alignment may include: The terminal device sends one or more reference signals to the network device by using each transmit beam, where resource multiplexing (for example, time domain and/or frequency domain resource multiplexing is performed in a manner of time division, frequency division, code division, or a combination thereof) may be performed between reference signals sent by using different transmit beams; the network device receives, by using each of a plurality of receive beams, the reference signal sent by each transmit beam of the terminal device, then estimates, based on the plurality of received reference signals, channel quality from each transmit beam of the terminal device to each receive beam of the base station, and determines a beam pair whose channel quality meets a preset condition Subsequently, the terminal device may send a control channel, a data channel, a sounding signal, or the like by using the transmit beam in the beam pair, and the network device may receive, by using a receive beam in the beam pair, the control channel, the data channel, the sounding signal, or the like that is sent by the terminal device.

In addition, when a transmit beam is a transmit beam of the network device, as shown in (e) in FIG. 1, the network device sends reference signals to the terminal device by using different transmit beams, and the terminal device receives, by using a same receive beam, the reference signals sent by the network device by using the different transmit beams, determines an optimal transmit beam of the network device based on the received signals, and then feeds back the optimal transmit beam of the network device to the network device, so that the network device updates the transmit beams. When a transmit beam is a transmit beam of the terminal device, as shown in (d) in FIG. 1, the terminal device sends reference signals to the network device by using different transmit beams, and the network device receives, by using a same receive beam, the reference signals sent by the terminal device by using the different transmit beams, determines an optimal transmit beam of the terminal device based on the received signals, and then feeds back the optimal transmit beam of the terminal device to the terminal device, so that the terminal device updates the transmit beams. A process of determining the optimal transmit beam based on received signals may be referred to as beam matching.

When a receive beam is a receive beam of the network device, as shown in (f) in FIG. 1, the terminal device sends reference signals to the network device by using a same transmit beam, and the network device receives, by using different receive beams, the reference signals sent by the terminal device, and then determines an optimal receive beam of the network device based on the received signals, to update the receive beams of the network device. When a receive beam is a receive beam of the terminal device, as shown in (c) in FIG. 1, the network device sends reference signals to the terminal device by using a same transmit beam, and the terminal device receives, by using different receive beams, the reference signals sent by the network device, and then determines an optimal receive beam of the terminal device based on the received signals, to update the receive beams of the terminal device.

A beam is a communication resource. The beam may be a wide beam, a narrow beam, or another type of beam. A technology for forming the beam may be a beamforming technology or another technical means. The beamforming technology may be a digital beamforming technology, an analog beamforming technology, or a hybrid digital/analog beamforming technology. Different beams may be considered as different resources. Same information or different information may be sent by using the different beams. Optionally, a plurality of beams with same or similar communication features may be considered as one beam. One beam may include one or more antenna ports, configured to transmit a data channel, a control channel, a sounding signal, and the like. For example, a transmit beam may be signal strength distribution formed in different directions in space after a signal is transmitted by using an antenna, and a receive beam may be signal strength distribution, in different directions in space, of a radio signal received from an antenna. It can be understood that the one or more antenna ports forming the beam may alternatively be considered as one antenna port set.

Beams may be classified into the transmit beam and the receive beam of the network device and the transmit beam and the receive beam of the terminal device. The transmit beam of the network device is used to describe transmit-side beamforming information of the network device, and the receive beam of the network device is used to describe receive-side beamforming information of the network device. The transmit beam of the terminal device is used to describe transmit-side beamforming information of the terminal device, and the receive beam of the terminal device is used to describe receive-side beamforming information of the terminal device. To be specific, the beam is used to describe beamforming information.

The beam may correspond to at least one of a time resource, a space resource, and a frequency domain resource. Optionally, the beam may alternatively correspond to a reference signal resource (for example, a reference signal resource for beamforming) or the beamforming information. Optionally, the beam may alternatively correspond to information associated with a reference signal resource of the network device. A reference signal may be a channel state information reference signal (Channel State Information Reference Signal, CSI-RS), a synchronization signal/physical broadcast channel block (synchronous signal/ PBCH block, SSB), a demodulation reference signal (demodulation reference signal, LAIRS), a phase tracking signal (phase tracking reference signal, PTRS), or a tracking signal (tracking reference signal, TRS), and the like. The information associated with the reference signal resource may be an index of the reference signal resource, quasi co-location (Quasi-collocation, QCL) information (especially QCL-TypeD), or the like. The index of the reference signal resource corresponds to a transmit-receive beam pair that is previously established during measurement performed based on a reference signal resource. The terminal device may infer beam information based on the index of the reference signal resource. Optionally, the beam may further correspond to a spatial domain filter (spatial filter or spatial domain filter), or a spatial domain transmission filter (spatial domain transmission filter).

The quasi co-location information may also be referred to as quasi co-location information. The QCL information is used to assist in describing the receive-side beamforming information and a receiving procedure of the terminal device. The QCI, information is used to indicate a QCL relationship between a source reference signal and a target reference signal. The target reference signal may be usually a demodulation reference signal (demodulation reference signal, DMRS), a channel state information reference signal (channel state information reference signal, CSI-RS), or the like. The source reference signal may be usually a CSI-RS, a tracking reference signal (tracking reference signal, TRS), a synchronization signal/physical broadcast channel block (synchronous signal/PBCH block, SSB), or the like. It should be to that spatial characteristic parameters of two reference signals or channels that meet the QCL relationship are the same, Therefore, a spatial characteristic parameter of the target reference signal can be inferred based on a resource index of the source reference signal.

The spatial characteristic parameter includes one or more of the following parameters: an angle of arrival (angle of arrival, AoA), a dominant (Dominant) angle of arrival, an average angle of arrival, a power angular spectrum (power angular spectrum, PAS) of the angle of arrival, an angle of departure (angle of departure, AoD), a dominant angle of departure, an average angle of departure, a power angular spectrum of the angle of departure, terminal transmit beamforming, terminal receive beamforming, spatial channel correlation, base station transmit beamforming, base station receive beamforming, an average channel gain, an average channel delay (average delay), a delay spread (delay spread), a Doppler spread (doppler spread), a Doppler shift (doppler shift), a spatial reception parameter (spatial Rx parameters), and the like.

These spatial characteristic parameters describe a characteristic of a spatial channel between an antenna port for the source reference signal and an antenna port for the target reference signal and help the terminal device complete a receive-side beamforming or a receiving processing process based on the QCL information. It should be understood that the terminal device may receive the target reference signal based on information about a receive beam that is of the source reference signal and that is indicated by the QCL information.

To reduce QCL information indication overheads of a network device side for a terminal device side, in an optional implementation, the network device side may indicate that a demodulation reference signal on a PDSCH or a PDCCH has a QCL relationship with one or more of a plurality of reference signal resources previously reported by the terminal device. For example, the reference signal may be a channel state information reference signal (Channel State Information Reference Signal, CSI-RS). Herein, an index of each reported CSI-RS resource corresponds to one transmit-receive beam pair previously established during measurement performed based on the CSI-RS resource. It should be understood that, information about receive beams of two reference signals or channels meeting a QCL relationship is the same. Therefore, the terminal device may infer, based on a resource index of the reference signal, information about a receive beam for receiving the PDCCH or the PDSCH.

Four types of QCL are defined in an existing standard, and the network device may simultaneously configure one or more types of QCL for the terminal device. For example, QCL-TypeA: a Doppler shift, a Doppler spread, an average delay, and a delay spread.

QCL-TypeB: the Doppler shift and the Doppler spread.

QCL-TypeC: the average delay and the Doppler shift.

QCL-TypeD: a spatial reception parameter.

It should be understood that spatial characteristic parameters of two reference signals or channels meeting spatial correlation information are the same. Therefore, the spatial characteristic parameter of the target reference signal can be inferred based on the resource index of the source reference signal.

These spatial characteristic parameters describe a characteristic of a spatial channel between an antenna port for the source reference signal and an antenna port for the target reference signal, and help the terminal device complete a transmit-side beamforming or a transmitting processing process based on the spatial correlation information. It should be understood that the terminal may transmit the target reference signal based on transmission beam information, indicated by the spatial correlation information, of the source reference signal.

Optionally, a beam may alternatively correspond to a spatial domain filter (spatial filter/spatial domain filter), a spatial domain transmission filter (spatial domain transmission filter), a spatial filter, or a spatial transmission filter. A receive beam is equivalent to a spatial transmission filter, a spatial domain transmission filter, a spatial domain receive filter, or a spatial receive filter. A transmit beam may be equivalent to a spatial domain filter, a spatial domain transmission filter, a spatial domain transmit filter, or a spatial transmit filter. Spatial correlation parameter information is equivalent to a spatial filter (spatial domain transmission/receive filter).

Further, the spatial filter generally includes a spatial transmit filter and/or a spatial receive filter. The spatial filter may also be referred to as a spatial domain transmit filter, a spatial domain receive filter, a spatial transmission filter, a spatial domain transmission filter, or the like. Optionally, a receive beam on the terminal side and a transmit beam on the network device side may serve as downlink spatial filters, and a transmit beam on the terminal side and a receive beam on the network device side may serve as uplink spatial filters.

Through beam training, the network device may communicate with the terminal device by using a preferred beam. However, because of blocking in a communication process and a poor diffraction capability in a high frequency channel, a current serving beam is blocked, and signal transmission cannot proceed. Considering that a beam is affected by an interference factor, to select a beam of better communication quality, the terminal device may be enabled to measure interference in a corresponding beam. Therefore, how to configure, for the terminal device, an interference measurement resource used to measure interference is an urgent problem to be resolved.

In addition, in the following, for a transmit side of the network device, a sent beam may be described as a resource for a reference signal. For example, a beam index 1 may be described as an index 1 of a resource for a reference signal. On a receive side of the terminal device, a received beam may be indicated by using the spatial reception parameter (Spatial Rx parameter) in QCL. The channel state information may be described as layer 1 (L1) reference signal received power (reference signal received power, RSRP) related information (related information).

In a communication system, different types of reference signals are usually used. A type of reference signal is used to estimate a channel, so that coherent demodulation can be performed on a received signal that includes control information or data. The other type is used to measure a channel state or channel quality, to schedule the terminal device. For example, the terminal device acquires the channel state information based on measurement of channel quality of the channel state information reference signal (Channel State information Reference Signal, CSI-RS). The channel state information may include at least one of a rank indicator (Rank Indicator, RI), a preceding matrix indicator (Preceding Matrix Indicator, PMI), a channel quality indicator (Channel Quality Indicator, CQI), and the like.

The resource for the reference signal may be a time-frequency resource. The time-frequency resource includes a time domain resource and/or a frequency domain resource. The NR system supports various time scheduling units, and a length of the time scheduling unit may be one or more time domain symbols. A symbol is an orthogonal frequency division multiplexing (orthogonal frequency division multiplexing, OFDM) symbol. The NR system includes a slot (slot), and one slot includes 14 symbols. The NR system supports a plurality of types of subcarrier spacings. When subcarrier spacings are different, time lengths corresponding to a slot are different. For example, when a subcarrier spacing is 15 kilohertz (kilohertz, kHz), a time length corresponding to a slot is 1 millisecond (millisecond, ms). For example, when a subcarrier spacing is 30 kHz, a time length corresponding to a slot is 0.5 ms. For example, when a subcarrier spacing is 60 kHz, a time length corresponding to a slot is 0.25 ms. For example, when a subcarrier spacing is 120 kHz, a time length corresponding to a slot is 0.125 ms. Because a quantity of symbols in one slot is always 14, it may be understood that a time length corresponding to the symbol also varies with a subcarrier spacing. The frequency domain resource may be one or more resource blocks (resource block, RB), or may be one or more resource elements (resource element, RE), or may be one or more carriers/cells, or may be one or more bandwidth parts (bandwidth part, BWP), or may be one or more RBs in one or more BWPs on one or more carriers, or may be one or more REs on one or more RBs in one or more BWPs on one or more carriers. The time domain resource may be one or more slots, or may be one or more symbols in one or more slots.

To resolve the foregoing problem, embodiments of this application provide a resource indication method. A basic principle of the resource indication method is as follows: A network device configures resource configuration information for a terminal device. After the terminal device receives the resource configuration information, the terminal device may determine channel state information based on the resource configuration information, and send the channel state information. The resource configuration information is used to indicate a first reference signal resource set, L second reference signal resource sets, and a type of the first reference signal resource set. The first reference signal resource set includes resources for M first reference signals, and the resource for the first reference signal is used to measure a channel. An $i^{th}$ second reference signal resource set includes resources for $N_i$ second reference signals, and the resource for the second reference signal is used to measure interference. A resource that is for a second reference signal and that corresponds to a resource for a $j^{th}$ first reference signal is determined based on the type of the first reference signal resource set, M is an integer greater than 1, L is an integer greater than or equal to 1, i is an integer greater than or equal to 1 and less than or equal to L, and $N_i$ is an integer greater than or equal to 1. According to the resource indication method provided in the embodiments of this application, an interference measurement resource used to measure interference can be configured for the terminal device, so that the terminal device can measure interference in a corresponding beam, and select a reference signal resource of better communication quality.

In the specification, claims, and accompanying drawings of this application, the terms "first", "second", "third" and the like are intended to distinguish different objects but do not limit a particular sequence.

In the embodiments of this application, the word such as "example" or "for example" is used to represent giving an example, an illustration, or a description. Any embodiment or design scheme described as an "example" or "for example" in the embodiments of this application should not be explained as being preferable or having more advantages than another embodiment or design scheme. Exactly, use of the word such as "example" or "for example" is intended to present a relative concept in a specific manner.

The following describes implementations of the embodiments of this application in detail with reference to the accompanying drawings.

Figure 3:
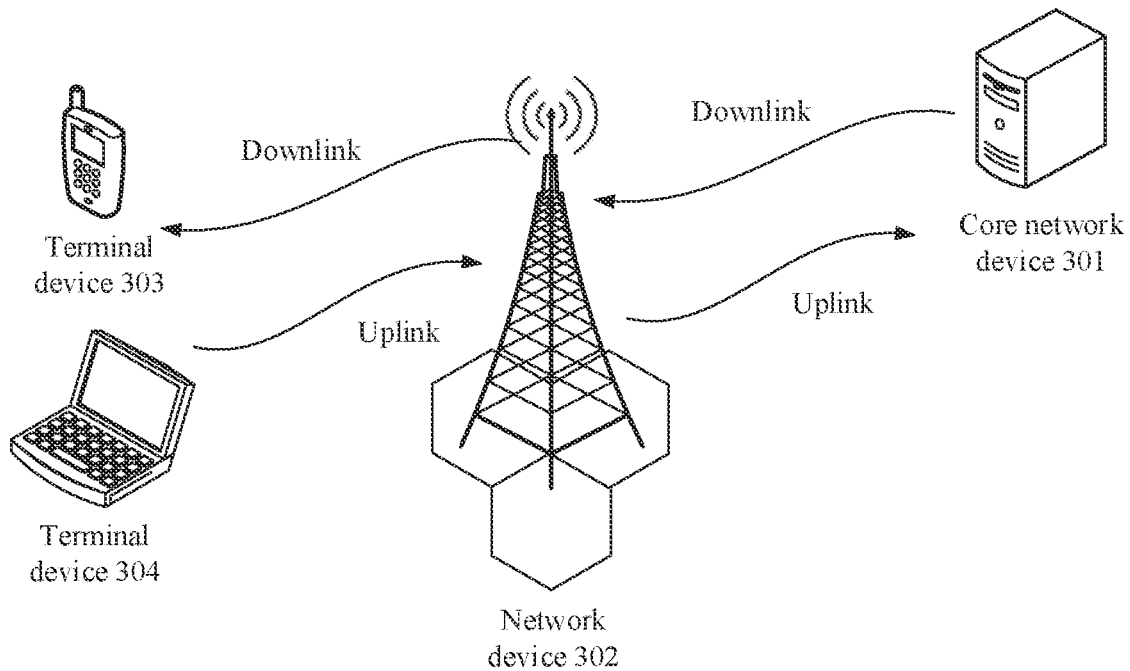
FIG. 3 is an example diagram of an architecture of a communication system according to an embodiment of this application.

FIG. 3 is an example diagram of an architecture of a communication system to which an embodiment of this application may be applied. As shown in FIG. 3, the communication system includes a core network device 301, a network device 302, and at least one terminal device (a terminal device 303 and a terminal device 304 shown in FIG. 3). The terminal device is connected to the network device in a wireless manner, and the network device is connected to the core network device in a wireless or wired manner. The core network device and the network device may be different physical devices independent of each other, or functions of the core network device and logical functions of the network device may be integrated into a same physical device, or a part of functions of the core network device and a part of functions of the network device may be integrated into one physical device. The terminal device may be at a fixed position or may be movable. FIG. 3 is merely a schematic diagram. The communication system may further include other network devices. For example, the communication system may further include a wireless relay device and a wireless backhaul device, which are not drawn in FIG. 3, Quantities of core network devices, network devices, and terminal devices included in the communication system are not limited in this embodiment of this application.

The terminal device (user equipment, UE) may be a wireless terminal device that can receive scheduling and indication information of the network device. The wireless terminal device may be a device that provides a user with voice and/or data connectivity, a handheld device having a wireless connection function, or another processing device connected to a wireless modem. The wireless terminal device may communicate with one or more core networks or the internet through a radio access network (radio access network, RAN). The wireless terminal device may be a mobile terminal device, such as a mobile phone (or referred to as a "cellular" phone and a mobile phone (mobile phone)), a computer, or a data card, for example, may be a portable, pocket-sized, handheld, computer built-in, or vehicle-mounted mobile apparatus that exchanges language and/or data with the radio access network. For example, the device may include a personal communication service (personal communication service, PCS) phone, a cordless phone, a session initiation protocol (SIP) phone, a wireless local loop (wireless local loop, WLL) station, a personal digital assistant (personal digital assistant, PDA), a tablet computer (Pad), and a computer having wireless transceiver function. The wireless terminal device may also be referred to as a system, a subscriber unit (subscriber unit), a subscriber station (subscriber station), a mobile station (mobile station), a mobile station (mobile station, MS), a remote station (remote station), an access point (access point, AP), a remote terminal device (remote terminal), an access terminal device (access terminal), a user terminal device (user terminal), a user agent (user agent), a subscriber station (subscriber station, SS), a customer premises equipment (customer premises equipment, CPE), a terminal (terminal), user equipment (user equipment, UE), a mobile terminal (mobile terminal, MT), or the like. Alternatively, the wireless terminal device may be a wearable device and a next-generation communication system, for example, a terminal device in a 5G network, a terminal device in a future evolved public land mobile network (public land mobile network, PLMN) network, and a terminal device in an NR communication system.

The network device is an entity used to transmit or receive a signal on a network side, for example, a generation NodeB (generation NodeB, gNodeB). The network device may be a device configured to communicate with a mobile device. The network device may be an AP in a wireless local area network (wireless local area networks, WLAN), a base transceiver station (base transceiver station, BTS) in global system for mobile communication (global system for mobile communication, GSM) or code division multiple access (code division multiple access, CDMA), or may be a NodeB (NodeB, NB) in wideband code division multiple access (wideband code division multiple access, WCDMA), or may be an evolved NodeB (evolutional Node B, eNB or eNodeB) in long term evolution (long term evolution, LTE), a relay station or an access point, a vehicle-mounted device, a wearable device, a network device in the future 3G network, a network device in the future evolved public land mobile network (public land mobile network, PLMN) network, a gNodeB in the NR system, or the like. In addition, in the embodiments of this application, the network device serves a cell, and the terminal device communicates with the network device by using a transmission resource (for example, a frequency domain resource, namely, a spectrum resource) used by the cell. The cell may be a cell corresponding to the network device (for example, a base station). The cell may belong to a macro base station, or may belong to a base station corresponding to a small cell (small cell). The small cell herein may include a metro cell (Metro cell), a micro cell (Micro cell), a pico cell (Pico cell), a femto cell (Femto cell), and the like. These small cells have characteristics of small coverage and a low transmit power, and are applicable to providing a high-rate data transmission service. In addition, in another possible case, the network device may be another apparatus that provides a wireless communication function for the terminal device. A specific technology and a specific device form that are used by the network device are not limited in the embodiments of this application. For ease of description, in the embodiments of this application, an apparatus that provides a wireless communication function for the terminal device is referred to as the network device.

Figure 4:
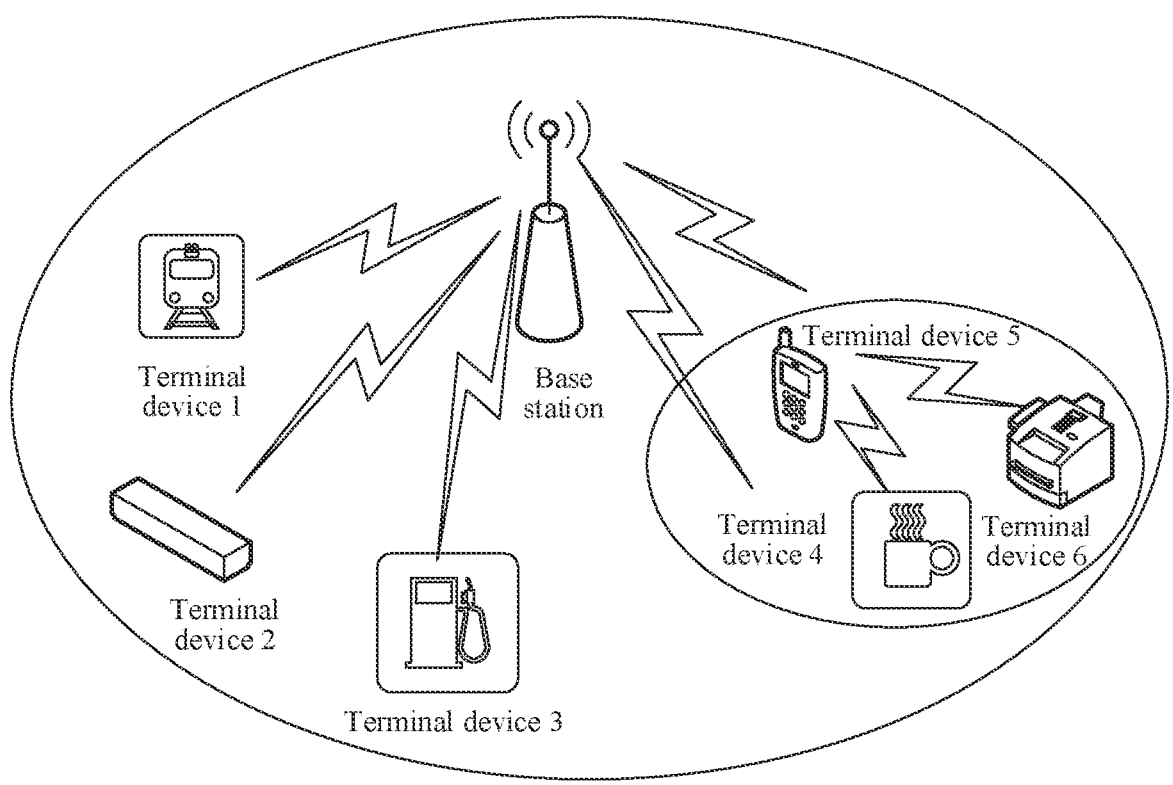
FIG. 4 is an example diagram of an architecture of another communication system according to an embodiment of this application.

The foregoing communication system may be a 3G NR system. The embodiments of this application may alternatively be applied to another communication system. As long as an entity in the communication system needs to send transmission direction indication information, another entity needs to receive the indication information, and determine, based on the indication information, a transmission direction that is within a specific time period. For example, FIG. 4 is an example diagram of an architecture of another communication system according to an embodiment of this application. As shown in FIG. 4, a communication system includes a base station and a terminal device 1 to a terminal device 6. In the communication system, the terminal device 1 to the terminal device 6 may send uplink data to the base station, and the base station receives the uplink data sent by the terminal device 1 to the terminal device 6. Alternatively, the base station may send downlink data to the terminal device 1 to the terminal device 6, and the terminal device 1 to the terminal device 6 receive the downlink data. In addition, a communication system may alternatively include the terminal device 4 to the terminal device 6. In the communication system, the terminal device 5 may receive uplink information sent by the terminal device 4 or the terminal device 6, and the terminal device 5 sends downlink information to the terminal device 4 or the terminal device 6.

The network device and the terminal device may be deployed on land, including an indoor or outdoor device, a handheld device, or a vehicle-mounted device, or may be deployed on a water surface, or may be deployed on aircraft, a balloon, a satellite in the air. Application scenarios of the network device and the terminal device are not limited in the embodiments of this application.

Communication between the network device and the terminal device and communication between terminal devices may be performed by using a licensed spectrum (licensed spectrum), or an unlicensed spectrum (unlicensed spectrum), or both a licensed spectrum and an unlicensed spectrum. The spectrum resource used between the network device and the terminal device is not limited in the embodiments of this application.

The embodiments of this application are applicable to downlink signal transmission, or are applicable to uplink signal transmission, or are applicable to device-to-device (device to device. D2D) signal transmission. Alternatively, the embodiments of this application are applicable to transmission in a V2X scenario. For the D2D signal transmission, a sending device is a terminal device, and a corresponding receiving device is also a terminal device. For the downlink signal transmission, a sending device is a network device, and a corresponding receiving device is a terminal device. After receiving the resource configuration information, the terminal device determines the channel state information based on the resource for the $j^{th}$ first reference signal and the resource that is for the second reference signal and that corresponds to the resource for the $j^{th}$ first reference signal, and sends the channel state information. For uplink signal transmission, a sending device is a terminal device, and a corresponding receiving device is a network device. The network device determines the channel state information based on the resource for the $j^{th}$ first reference signal and the resource that is for the second reference signal and that corresponds to the resource for the $j^{th}$ first reference signal.

Figure 5:
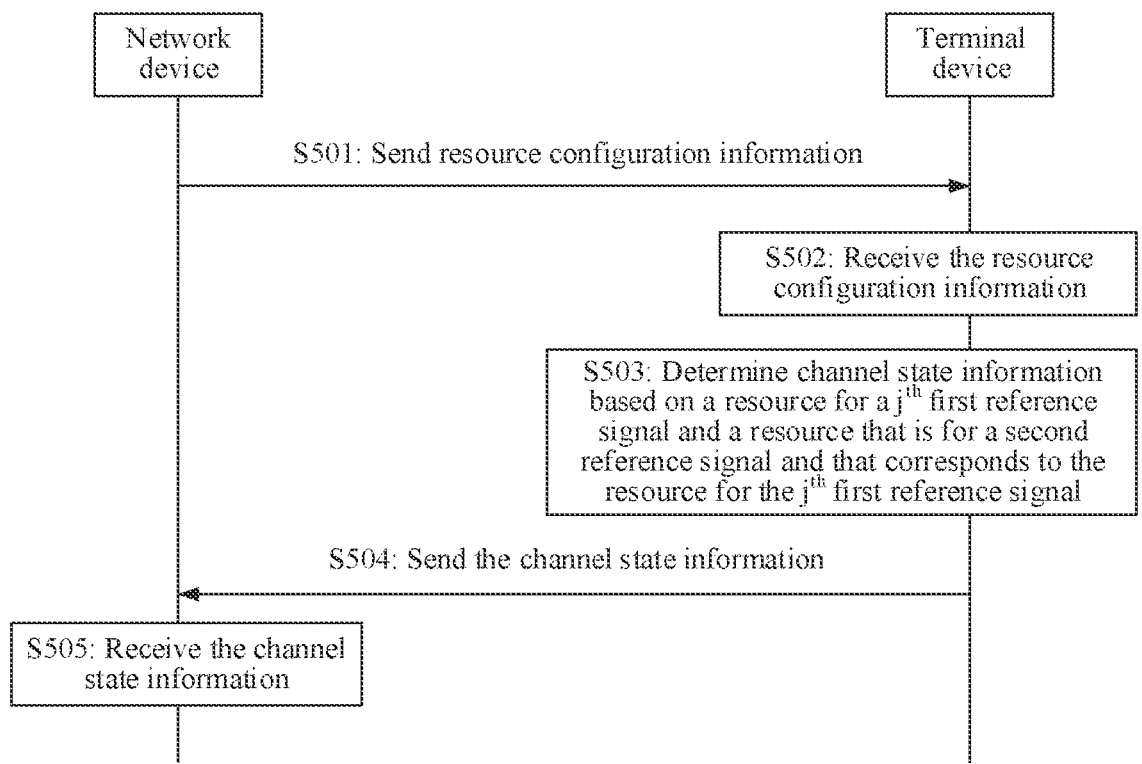
FIG. 5 is a flowchart of a resource indication method according to an embodiment of this application.

The following uses the downlink signal transmission as an example to describe in detail the resource indication method provided in the embodiments of this application. FIG. 5 is a flowchart of a resource indication method according to an embodiment of this application. As shown in FIG. 5, the method may include the following steps.

S501: A network device sends resource configuration information to a terminal device.

The resource configuration information is used to indicate a first reference signal resource set, L second reference signal resource sets, and a type of the first reference signal resource set. Optionally, the first reference signal resource set, the L second reference signal resource sets, and the type of the first reference signal resource set may alternatively belong to different resource configuration information. For example, first resource configuration information is used to indicate the first reference signal resource set and the type of the first reference signal resource set. Second resource configuration information is used to indicate the L second reference signal resource sets. This is not limited in this embodiment of this application. The resource configuration information may be higher layer signaling, layer 2 signaling, or layer 1 signaling. For example, the higher layer signaling may be radio resource control (Radio Resource Control, RRC) signaling, the layer 2 signaling may be media access control control element (media access control control element, MAC-CE) signaling, and the layer 1 signaling may be downlink control information (Downlink Control Information, Da) signaling.

The first reference signal resource set may include resources for M first reference signals, and M is an integer greater than 1. The resource for the first reference signal is used to measure a channel. The resource for the first reference signal may be referred to as a channel measurement resource (channel measurement resource, CMR). It may be understood that the first reference signal carried on the resource for each first reference signal in the resources for the M first reference signals is used to measure the channel. The first reference signal may be an NZP CSI-RS or an SSB. The resource for the first reference signal may be a resource for the NZP CSI-RS or a resource for the SSB.

The type of the first reference signal resource set includes a first type and a second type. The first type is used to indicate that the M first reference signals use different downlink spatial transmission filters (spatial domain transmission filter). "The M first reference signals use different downlink spatial transmission filters" may mean that the terminal device does not assume that a same spatial filter is used. To be specific, at least two reference signals use different spatial transmission filters. The network device may configure a repetition (replication) field of the first reference signal resource set to "of" by using higher layer signaling (for example, RRC signaling), to indicate that the type of the first reference signal resource set is the first type. The first reference signal resource set of the first type may be a resource set for NZP CSI-RSs. The first reference signal resource set of the first type may be used by the terminal device to train a transmit beam on a network device side. The second type is used to indicate that the M first reference signals use a same downlink spatial transmission filter. The network device may configure a repetition (replication) field of the first reference signal resource set to "on" by using higher layer signaling (for example, RRC signaling), to indicate that the type of the first reference signal resource set is the second type. The first reference signal resource set of the second type may be used by the terminal device to train a receive beam on a terminal device side.

It should be noted that the type of the first reference signal resource set may be configured by the network device, or may be determined by the terminal device based on the resource configuration information. The first type may also be used to indicate that the resources for the M first reference signals use the different downlink spatial transmission filters. The second type may also be used to indicate that the resources for the M first reference signals use the same downlink spatial transmission filter.

Optionally, the L second reference signal resource sets may include resources for N second reference signals, and N is an integer greater than or equal to 1. A value range of L may be an integer greater than or equal to 1. For different values of L, the resource configuration information may indicate one second reference signal resource set or at least two second reference signal resource sets. For example, when L=1, the resource configuration information may indicate one second reference signal resource set. When L=2, the resource configuration information may indicate two second reference signal resource sets. When L=3, the resource configuration information may indicate three second reference signal resource sets. A quantity of resources for second reference signal included in each of the L second reference signal resource sets may be the same as or different from one another. An $i^{th}$ second reference signal resource set may include resources for $N_i$ second reference signals, $N_i$ where is an integer greater than or equal to 1, and i is an integer greater than or equal to 1 and less than or equal to L. For example, when L=2, the $1^{st}$ second reference signal resource set may include resources for two second reference signals, and the $2^{nd}$ second reference signal resource set may also include resources for two second reference signals. Alternatively, the $1^{st}$ second reference signal resource set may include resources for 16 second reference signals, and the $2^{nd}$ second reference signal resource set may also include resources for four second reference signals. This is not limited in this embodiment of this application. The resource for the second reference signal is used to measure interference. The resource for the second reference signal may be referred to as an interference measurement resource (interference measurement resource. IMR). The second reference signal may be an NZP CSI-RS or CSI-IM. The resource for the second reference signal may be a resource for the NZP CST-RS or a resource for the CSI-IM.

The resource for each first reference signal included in the first reference signal resource set is associated with resources for a part or all of the second reference signals included in the L second reference signal resource sets, Therefore, when measuring the channel based on the resource for the first reference signal, the terminal device measures interference in the corresponding resource for the first reference signal by using the resource that is for the second reference signal and that is associated with the resource for the first reference signal, to select a reference signal resource of better communication quality.

The following uses a resource for a $j^{th}$ first reference signal as an example to describe in detail a correspondence between the resource for the $j^{th}$ first reference signal and a resource that is for a second reference signal and that corresponds to the resource for the $j^{th}$ first reference signal. In this specification, the resource that is for the second reference signal and that corresponds to the resource for the $j^{th}$ first reference signal may also be understood as a resource that is for a second reference signal and that is associated with the resource for the $j^{th}$ first reference signal.

In a first implementation, the resource that is for the second reference signal and that corresponds to the resource for the $j^{th}$ first reference signal may be a resource that is for a second reference signal and that meets a QCL relationship with the resource for the $j^{th}$ first reference signal. The resource that is for the second reference signal and that meets the QCI, relationship with the resource for the $j^{th}$ first reference signal may be the resources for the part or all of the second reference signals in the L second reference signal resource sets.

Figure 6:
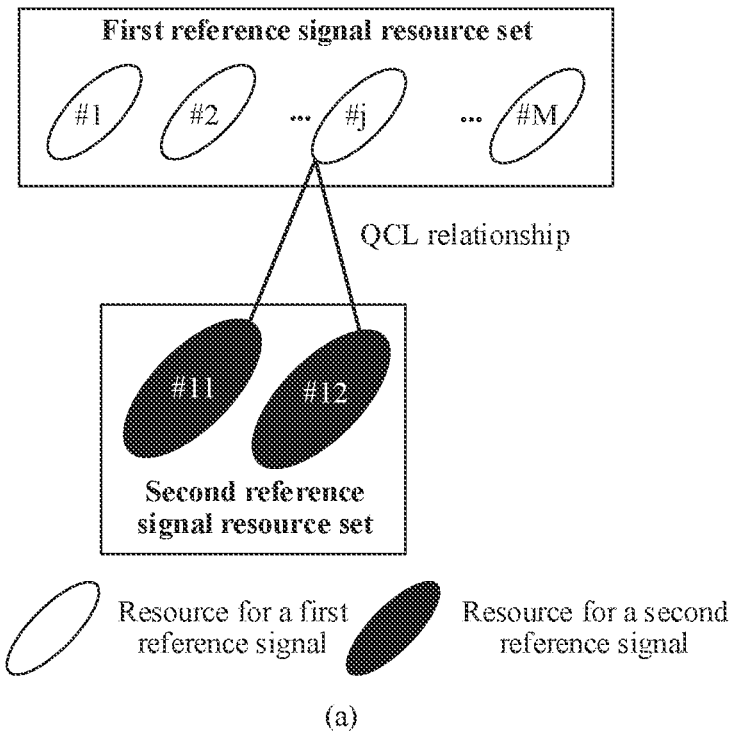
FIG. 6 is an example diagram of a resource configuration according to an embodiment of this application.
Figure 6:
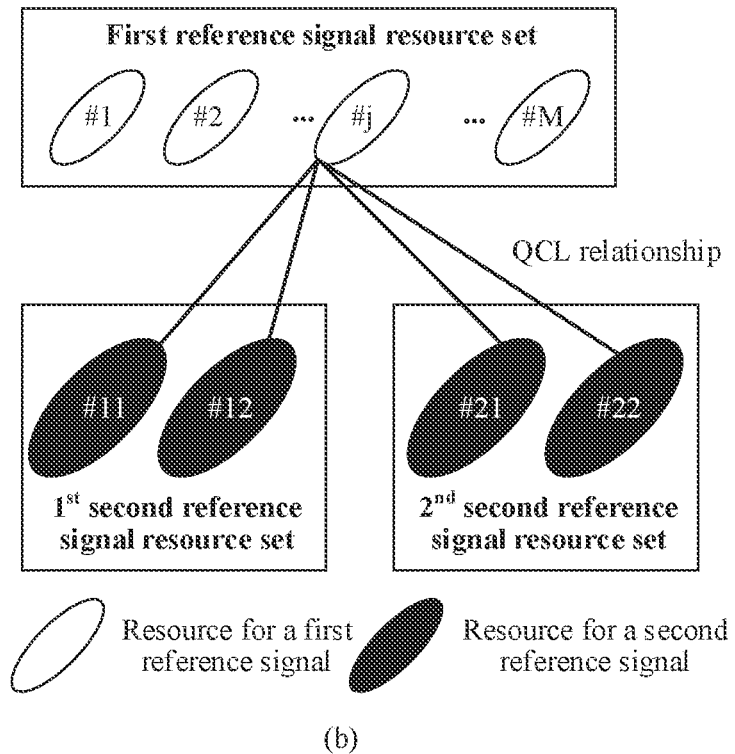

"Resources for all of the second reference signals" may be resources for all the second reference signals included in the L second reference signal resource sets. For example, as shown in (a) in FIG. 6, assuming that L=1 and the second reference signal resource set includes resources for two second reference signals, the resources for all of the second reference signals include the resources for the two second reference signals. The resource for the $j^{th}$ first reference signal and both resources for the two second reference signals meet the QCL relationship. For convenience, the resource for the first reference signal is numbered by using #n. For example, in the first reference signal resource set, #1 represents a resource for the $1^{st}$ first reference signal, #j represents the resource for titer first reference signal, and #M represents a resource for an $M^{th}$ first reference signal. The resource for the second reference signal is numbered by using #xy. In the $1^{st}$ second reference signal resource set, #11 represents a resource for the $1^{st}$ second reference signal in the $1^{st}$ second reference signal resource set, and #12 represents a resource for the $2^{nd}$ second reference signal in the $1^{st}$ second reference signal resource set. In the $2^{nd}$ second reference signal resource set, #21 represents a resource for the $1^{st}$ second reference signal in the $2^{nd}$ second reference signal resource set, and #22 represents a resource for the $2^{nd}$ second reference signal in the $2^{nd}$ second reference signal resource set. As shown in (b) in FIG. 6, it is assumed that L=2, the $1^{st}$ second reference signal resource set includes resources for two second reference signals, and the $2^{nd}$ second reference signal resource set includes resources for two second reference signals. Resources for all second reference signal include resources for four second reference signals, namely, a resource #11 for a second reference signal, a resource #12 for a second reference signal, a resource #21 for a second reference signal, and a resource #22 for a second reference signal. The resource for the $j^{th}$ first reference signal and all the resources for the four second reference signals meet the QCL relationship.

Figure 7:
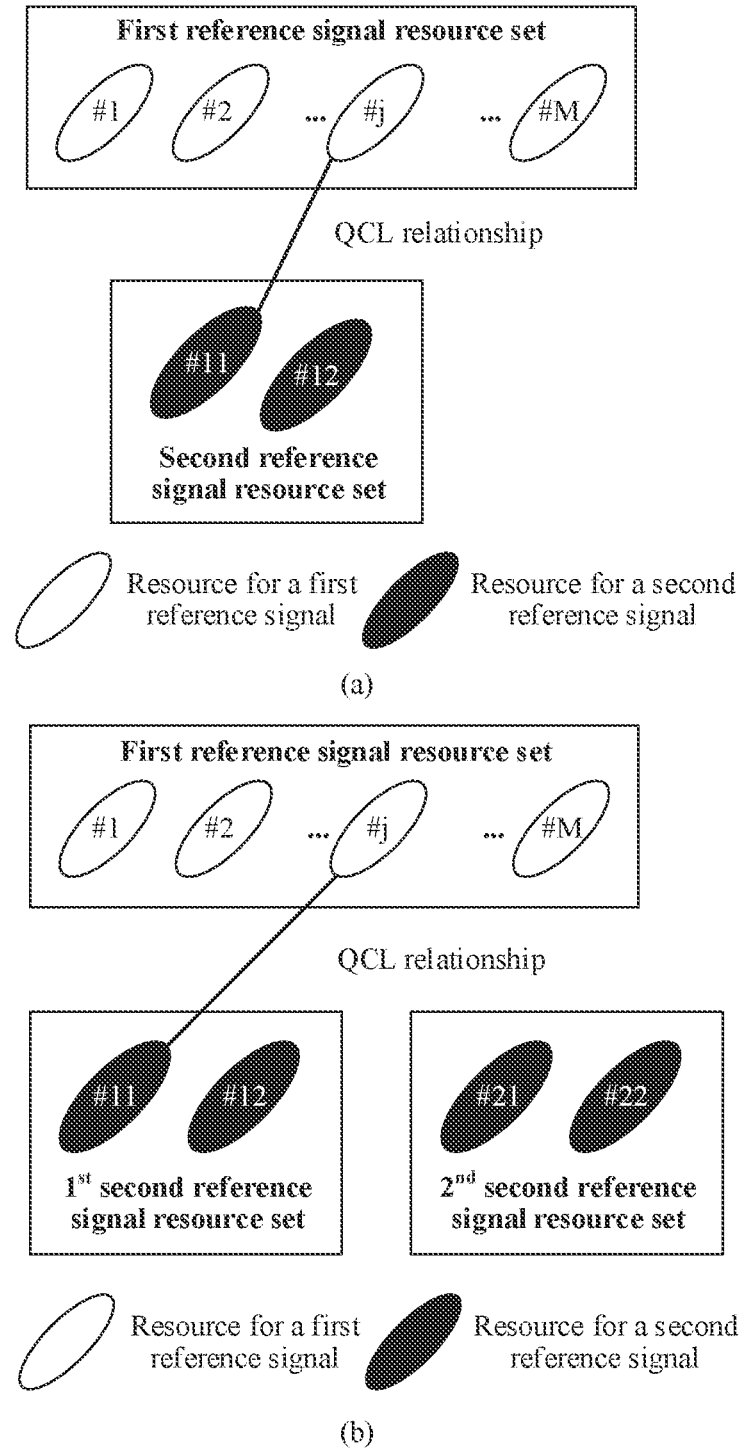
FIG. 7 is an example diagram of another resource configuration according to an embodiment of this application.

"A resource for a part of the second reference signals" may be a resource for a part of second reference signals included in one of the L second reference signal resource sets. For example, as shown in (a) in FIG. 7, it is assumed that L=1 and the second reference signal resource set includes resources for two second reference signals, namely, a resource #11 for a second reference signal and a resource #12 for a second reference signal. The resource for the part of the second reference signals may include the resource #11 for the second reference signal. The resource for the $j^{th}$ first reference signal and the resource #11 for the second reference signal meet the QCL relationship. Optionally, the resource for the part of the second reference signals may alternatively include the resource #12 for the second reference signal. The resource for the $j^{th}$ first reference signal and the resource #12 for the second reference signal meet the QCL relationship. As shown in (h) in FIG. 7, it is assumed that L=2 and the $1^{st}$ second reference signal resource set includes resources for two second reference signals, namely, a resource #11 for a second reference signal and a resource

12 for a second reference signal. The $2^{nd}$ second reference signal resource set includes resources for two second reference signals, namely, a resource #21 for a second reference signal and a resource #22 for a second reference signal. The resource for the pan of the second reference signals may include a resource for one second reference signal, for example, the resource #11 of the second reference signal. The resource for the $j^{th}$ first reference signal and the resource #11 for the second reference signal meet the QCI, relationship. Optionally, the resource for the part of the second reference signals may alternatively include the resource #12 for the second reference signal. The resource for the $j^{th}$ first reference signal and the resource #12 for the second reference signal meet the QCL relationship. Optionally, the resource for the part of the second reference signals may alternatively include the resource #21 for the second reference signal. The resource for the $j^{th}$ first reference signal and the resource #21 for the second reference signal meet the QCL relationship. Optionally, the resource for the part of the second reference signals may alternatively include the resource #22 for the second reference signal. The resource for the $j^{th}$ first reference signal and the resource #22 for the second reference signal meet the QCL relationship.

Figure 8:
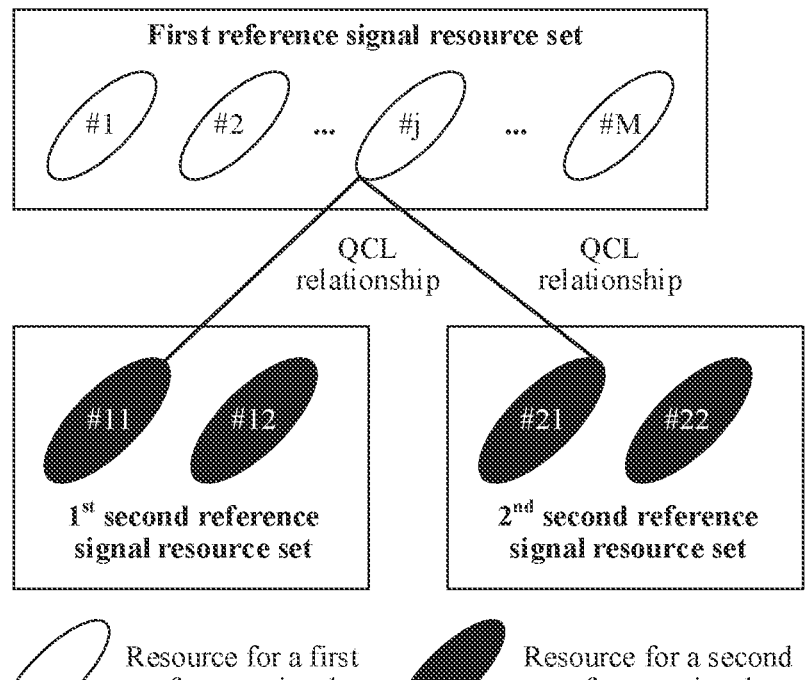
FIG. 8 is an example diagram of still another resource configuration according to an embodiment of this application.
Figure 8:
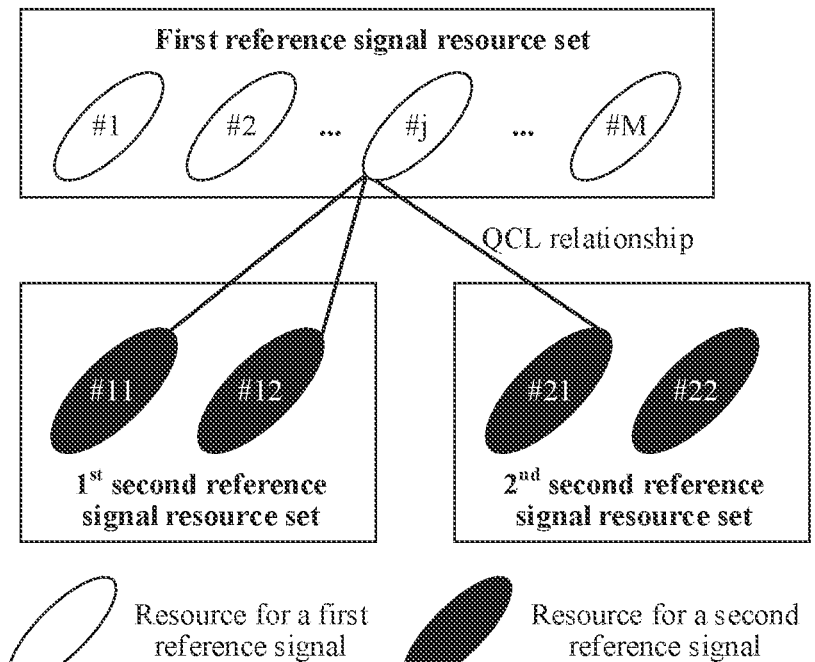

"A resource for a part of the second reference signals" may alternatively be a sum of resources each for a part of second reference signals included in each of at least two of the L second reference signal resource sets. For example, the resource for the part of the second reference signals includes a resource for a part of second reference signals in the $1^{st}$ second reference signal resource set and a resource for a part of second reference signals in the $2^{nd}$ second reference signal resource set. As shown in (a) in FIG. 8, it is assumed that L=2 and the $1^{st}$ second reference signal resource set includes resources for two second reference signals, namely, a resource #11 for a second reference signal and a resource #12 for a second reference signal. The $2^{nd}$ second reference signal resource set includes resources for two second reference signals, namely, a resource #21 for a second reference signal and a resource #22 for a second reference signal. The resource for the part of the second reference signals may include resources for two second reference signals, for example, the resource #11 for the second reference signal and the resource #21 for the second reference signal. The resource for the $j^{th}$ first reference signal and both of the resource #11 for the second reference signal and the resource #21 for the second reference signal meet the QCL relationship. Optionally, the resource for the part of the second reference signals may alternatively include the resource #11 for the second reference signal and the resource #22 for the second reference signal. The resource for the $j^{th}$ first reference signal and both of the resource #11 for the second reference signal and the resource #22 for the second reference signal meet the QCL relationship. Optionally, the resource for the part of the second reference signals may alternatively include the resource #12 for the second reference signal and the resource #22 for the second reference signal. The resource for the $j^{th}$ first reference signal and both of the resource #12 for the second reference signal and the resource #22 for the second reference signal meet the QCL relationship. Optionally, the resource for the part of the second reference signals may alternatively include the resource #12 for the second reference signal and the resource #21 for the second reference signal. The resource for the $j^{th}$ first reference signal and both of the resource #12 for the second reference signal and the resource #21 for the second reference signal meet the QCL relationship.

"A resource for a part of the second reference signals" may alternatively be resources for all second reference signals in one second reference signal resource set and resources for a part of second reference signals in another second reference signal resource set. As shown in (h) in FIG. 8, the resource for the part of the second reference signals may include resources for three second reference signals, for example, a resource #11 for a second reference signal, a resource #12 for a second reference signal, and a resource #21 for a second reference signal. The resource for the $j^{th}$ first reference signal and all of the resource #11 for the second reference signal, the resource #12 for the second reference signal, and the resource #21 for the second reference signal meet the QCL relationship.

In this embodiment of this application, a quantity of Ls is not limited, and L may be any value. A quantity of resources for second reference signals included in the L second reference signal resource sets may not be equal to M, that is, $L*N_i$ is not equal to M. Optionally, M may alternatively not be equal to $N_i$. It may also be understood as that a quantity of CMRs is greater than 1, and the quantity of CMRs may not be equal to a quantity of IMRs. In addition, the foregoing explanations of the resource for the part of the second reference signals are also examples for description, and are not limited. Any resource other than the resources for all the second reference signals included in the L second reference signal resource sets is the resource for the part of the second reference signals.

The resource for each first reference signal in the first reference signal resource set may, correspond to the resource for the second reference signal in the second reference signal resource set based on the foregoing descriptions. In addition, second reference signals that are in the second reference signal resource set and that correspond to the resources for all the first reference signals in the first reference signal resource set may be the same or may be different. Alternatively, a resource for a part of the first reference signals in the first reference signal resource set may correspond to a resource for a part of second reference signals in the second reference signal resource set. For example, resources for two first reference signals in the first reference signal resource set may correspond to resources for two second reference signals in the second reference signal resource set. Alternatively, a resource for all of the first reference signals in the first reference signal resource set may correspond to a resource for a part of second reference signals in the second reference signal resource set. Alternatively, resources for all the first reference signals in the first reference signal resource set may correspond to resources for all second reference signals in the second reference signal resource set.

For example, the resource for each first reference signal in the first reference signal resource set and the resource for the second reference signal in the second reference signal resource set meet the QCL relationship. In addition, the second reference signals that are in the second reference signal resource set and that correspond to the resources for all the first reference signals in the first reference signal resource set may be the same or may be different. Alternatively, the resource for the part of the first reference signals in the first reference signal resource set and the resource for the part of the second reference signals in the second reference signal resource set meet the QCL relationship. Alternatively, the resources for all of the first reference signals in the first reference signal resource set and the resource for the part of the second reference signals in the second reference signal resource set meet the QCL relationship. Alternatively, the resource for the part of the first reference signals in the first reference signal resource set and the resources for all of the second reference signals in the second reference signal resource set meet the QCL relationship. Alternatively, the resources for all of the first reference signals in the first reference signal resource set and the resources for all of the second reference signals in the second reference signal resource set meet the QCL relationship. Alternatively, the first reference signal resource set and the second reference signal resource set meet the QCL relationship.

It should be understood that, in this embodiment of this application, optionally, the QCL, relationship between the resource for the first reference signal and the resource for the second reference signal may be described as a QCL, relationship between the first reference signal and the second reference signal, or may be described as a QCL relationship between all or a part of ports of the first reference signal and all or a part of ports of the second reference signal.

In a second implementation, the resource that is for the second reference signal and that corresponds to the resource for the $j^{th}$ first reference signal is a resource that is for a second reference signal and that is reported by the terminal device and meets a QCL relationship with the resource for the $j^{th}$ first reference signal. It may be understood that resources that are for second reference signals and that meet the QCL relationship with the resource for the $j^{th}$ first reference signal are first determined. Then, a resource for a part of the second reference signals in the resources that are for second reference signals and that meet the QCL relationship with the resource for the $j^{th}$ first reference signal is determined as the resource that is for the second reference signal and that is reported by the terminal device. For the network device, the resource that is for the second reference signal and that corresponds to the resource for the $j^{th}$ first reference signal is a resource that meets the QCL relationship with the resource for the $j^{th}$ first reference signal and that corresponds to a second reference signal resource index received by the network device. For example, as shown in (b) in FIG. 8, the resource for the $j^{th}$ first reference signal and all of a resource #11 for a second reference signal, a resource #12 for a second reference signal, and a resource #21 for a second reference signal meet the QCI, relationship. Resources that are for second reference signals and that are reported by the terminal device may be the resource #11 for the second reference signal and the resource #12 for the second reference signal.

Optionally, the resource that is for the second reference signal and that corresponds to the resource for the $j^{th}$ first reference signal may be determined based on the type of the first reference signal resource set. In other words, for different types of first reference signal resource sets, a correspondence between the resource for the $j^{th}$ first reference signal and the resource that is for the second reference signal and that meets the QCL relationship with the resource for the $j^{th}$ first reference signal may be different.

In this specification, that the resource for the $j^{th}$ first reference signal and the resource that is for the second reference signal and that corresponds to the resource for the $j^{th}$ first reference signal meet the QCL relationship may also be described as that the $j^{th}$ first reference signal and the second reference signal corresponding to the $j^{th}$ first reference signal meet the QCL relationship. The $j^{th}$ first reference signal is a first reference signal carried on the resource for the $j^{th}$ first reference signal, the second reference signal corresponding to the $j^{th}$ first reference signal is a second reference signal carried on the resource that is for the second reference signal and that corresponds to the resource for the $j^{th}$ first reference signal.

If the type of the first reference signal resource se is the first type, the $j^{th}$ first reference signal and a second reference signal in the L second reference signal resource sets meet the QCL relationship.

Example 1: A $k^{th}$ port of the $j^{th}$ first reference signal and a $k^{th}$ port of the second reference signal in the L second reference signal resource sets meet a QCL relationship, where k is an integer greater than or equal to 1. It may be understood that a quantity of ports for sending the second reference signal in the L second reference signal resource sets is equal to a quantity of ports for sending the $j^{th}$ first reference signal, a $k^{th}$ port of the first reference signal and a $k^{th}$ port of the second reference signal meet the QCL relationship, and a $(k+1)^{th}$ port of the first reference signal and a $(k+1)^{th}$ port of the second reference signal meet the QCL relationship. For example, the $j^{th}$ first reference signal may be sent by using a port 1 and a port 2, and the terminal device separately receives, by using different spatial reception parameters, the $j^{th}$ first reference signal sent by using the port 1 and the port 2. For example, the terminal device receives, by using QCL-TypeD a, the $j^{th}$ first reference signal sent by using the port 1, and receives, by using QCL-TypeD b, the $j^{th}$ first reference signal sent by using the port 2. Likewise, the second reference signal on the resource that is for the second reference signal and that is associated with the resource for the $j^{th}$ first reference signal may also be sent by using a port 1 and a port 2. The terminal device receives, by using the spatial reception parameters for receiving the $j^{th}$ first reference signal, the second reference signal sent by using a port 1 and a port 2. For example, the terminal device receives, by using QCL-TypeD a, the second reference signal sent by using the port 1, and receives, by using QCL-TypeD b, the second reference signal sent by using the port 2.

Example 2: A port of the $j^{th}$ first reference signal and a port of the second reference signal in the L second reference signal resource sets meet a QCL relationship. It may be understood that a quantity of ports for sending the second reference signal in the L second reference signal resource sets may be the same as or different from a quantity of ports for sending the $j^{th}$ first reference signal. In addition, the $j^{th}$ first reference signal may be sent by using one port, and the terminal device may receive, by using a same spatial reception parameter, the $j^{th}$ first reference signal sent by using the port. Likewise, a second reference signal on a resource that is for a second reference signal and that is associated with the resource for the $j^{th}$ first reference signal may also be sent by using one port, and the terminal device may receive, by using the spatial reception parameter for receiving the $j^{th}$ first reference signal, the second reference signal sent by using the port. Alternatively, the $j^{th}$ first reference signal may be sent by using at least two ports, and the terminal device may receive, by using a same spatial reception parameter, the $j^{th}$ first reference signal sent by using the at least two ports. Likewise, a second reference signal on a resource that is for a second reference signal and that is associated with the resource for the $j^{th}$ first reference signal may also be sent by using at least two ports, and the terminal device may receive, by using the spatial reception parameter for receiving the first reference signal, the second reference signal sent by using the at least two ports.

It should be noted that each first reference signal in the first reference signal resource set and the second reference signal in the L second reference signal resource sets may meet the QCL relationship, for example, the correspondences in Example 1 and Example 2.

Optionally, a plurality of first reference signals in the first reference signal resource set and a part or all of second reference signals in the L second reference signal resource sets may meet the QCL relationship. The plurality of first reference signals may correspond to a same second reference signal. For example, the $j^{th}$ first reference signal corresponds to the second reference signal on the resource #11 for the second reference signal, and a $(j+1)^{th}$ first reference signal also corresponds to the second reference signal on the resource #11 for the second reference signal. Alternatively, the plurality of first reference signals may correspond to a plurality of same second reference signals. For example, the $j^{th}$ first reference signal corresponds to the second reference signal on the resource #11 for the second reference signal and the second reference signal on the resource #12 for the second reference signal, and a $(j+1)^{th}$ first reference signal also corresponds to the second reference signal on the resource #11 for the second reference signal and the second reference signal on the resource #12 for the second reference signal. A plurality of channel measurement resources share one interference measurement resource set. The terminal device may select an interference measurement resource from the interference measurement resource set for each channel measurement resource, to calculate an L1-SINR. Alternatively, the plurality of first reference signals may correspond to a plurality of different second reference signals. For example, the $j^{th}$ first reference signal corresponds to the second reference signal on the resource #11 for the second reference signal and the second reference signal on the resource #12 for the second reference signal, and a $(j+1)^{th}$ first reference signal also corresponds to the second reference signal on the resource #21 for the second reference signal and the second reference signal on the resource #22 for the second reference signal.

If the type of the first reference signal resource set is the second type, the quantity of the resources for the second reference signals included in each of the L second reference signal resource sets is equal to a quantity of the resources for the first reference signals included in the first reference signal resource set. That is, $M=N_i$. The $j^{th}$ first reference signal and a $j^{th}$ second, reference signal meet the QCL relationship. The $j^{th}$ second reference signal is a second reference signal carried on a resource for the $j^{th}$ second reference signal. The resource for the $j^{th}$ second, reference signal is one of the resources for the $N_i$ second reference signals included in the $i^{th}$ second reference signal resource set.

Figure 9:
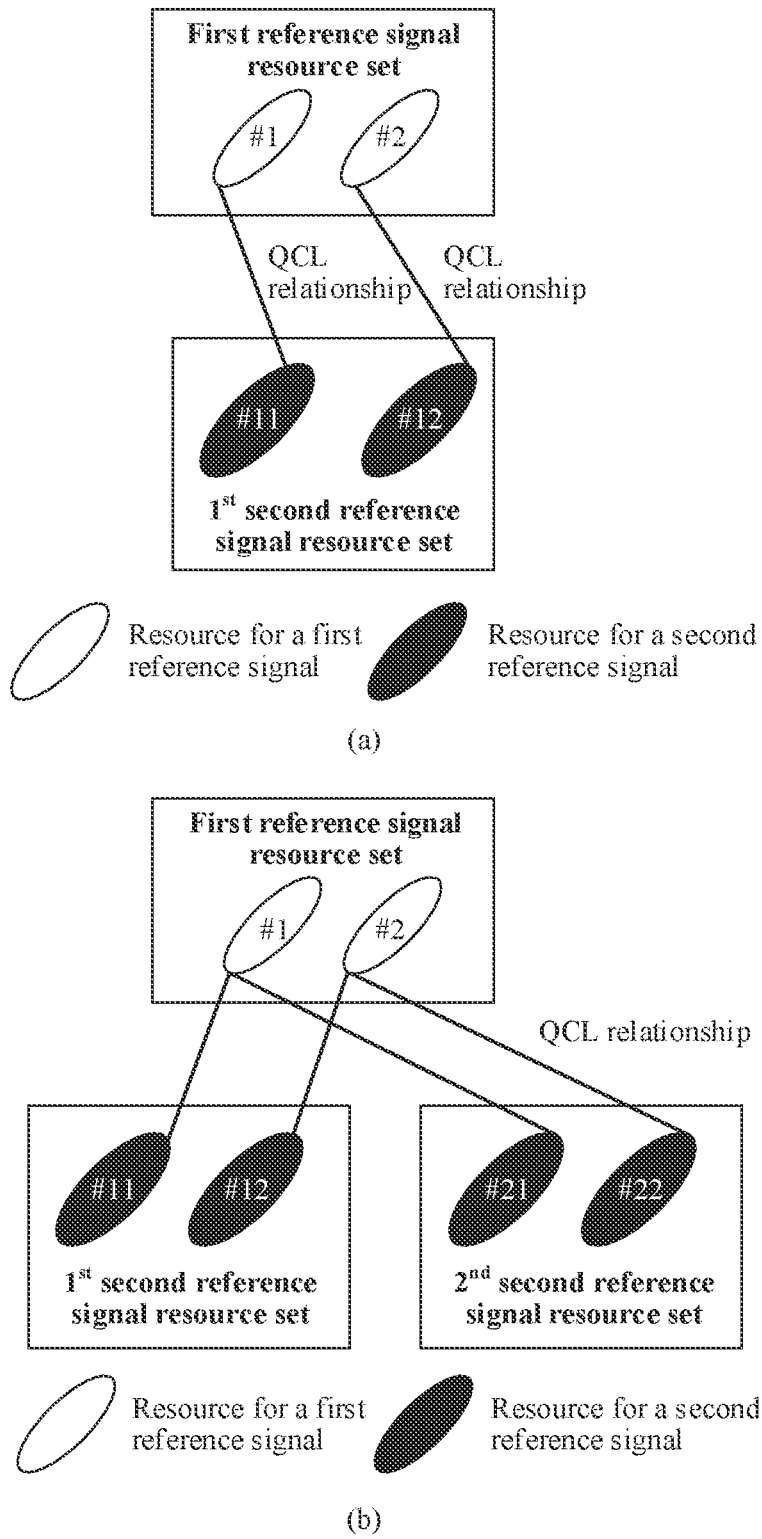
FIG. 9 is an example diagram of yet another resource configuration according to an embodiment of this application.

For example, as shown in (a) in FIG. 9, it is assumed that the first reference signal resource set includes resources for two first reference signals, namely, a resource #1 for a first reference signal and a resource #2 for a first reference signal. If L=1, the second reference signal resource set includes resources for two second reference signals, namely, a resource #11 for a second reference signal and a resource #12 for a second reference signal. The first reference signal carried on the resource #1 for the first reference signal and the second reference signal carried on the resource #11 for the second reference signal meet the QCI, relationship. The first reference signal carried on the resource #2 for the first reference signal and the second reference signal carried on the resource #12 for the second reference signal meet the QCL relationship. As shown in (h) in FIG. 9, it is assumed that L=2 and the $2^{nd}$ second reference signal resource set includes resources for two second reference signals, namely, a resource #21 for a second reference signal and a resource #22 for a second reference signal. A first reference signal carried on a resource #1 for the first reference signal and second reference signals carried on a resource #11 for a second reference signal and the resource #21 for the second reference signal meet the QCL relationship. A first reference signal carried on a resource #2 for the first reference signal and second reference signals carried on a resource #12 for a second reference signal and the resource #22 for the second reference signal meet the QCL relationship.

If the type of the first reference signal resource set is the second type, a quantity of the L second reference signal resource sets is equal to the quantity of the resources for the first reference signals included in the first reference signal resource set. That is, M=L. The $j^{th}$ first reference signal and a second reference signal in a $j^{th}$ second reference signal resource set meet the QCL relationship.

Optionally, if the type of the first reference signal resource set is the first type, a quantity of the L second reference signal resource sets is equal to the quantity of the resources for the first reference signals included in the first reference signal resource set. That is, M=L The $j^{th}$ first reference signal and a second reference signal in a $j^{th}$ second reference signal resource set meet the QCL relationship. The L second reference signal resource sets may be completely the same, or may be partially the same (for example, the $1^{st}$ second reference signal resource set is the same as the $2^{nd}$ second reference signal resource set).

Figure 10:
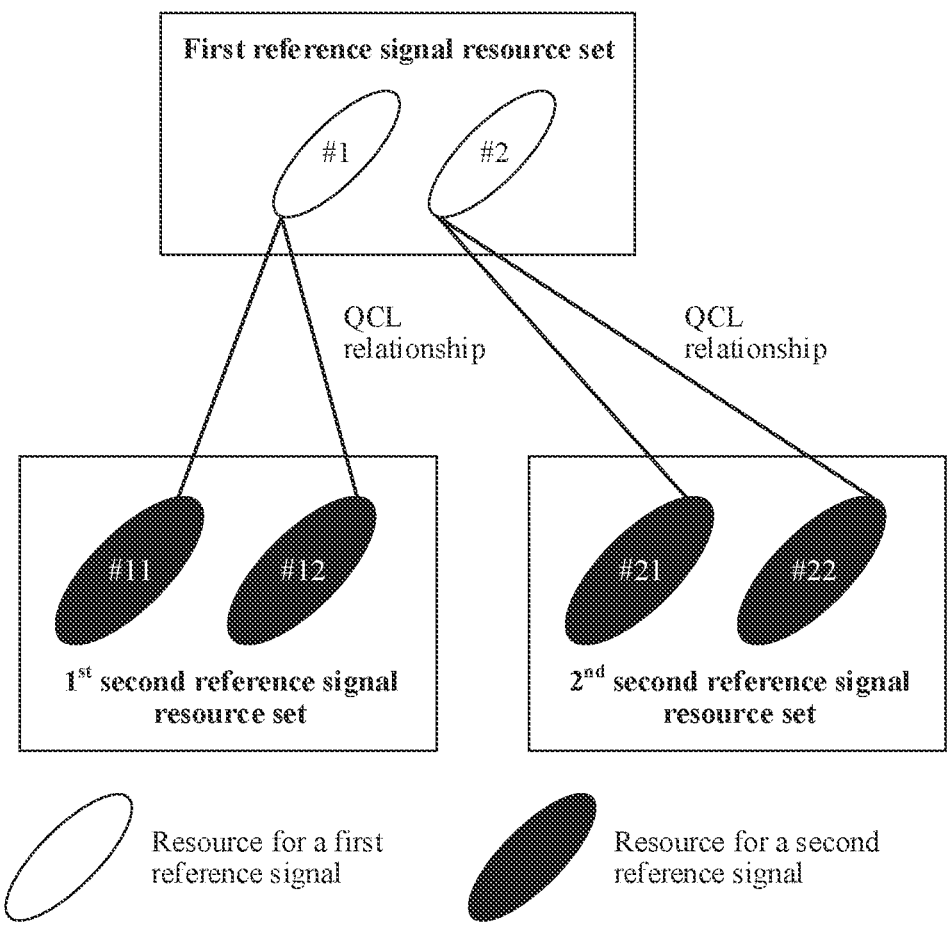
FIG. 10 is an example diagram of yet another resource configuration according to an embodiment of this application.

For example, as shown FIG. 10, it is assumed that the first reference signal resource set includes resources for two first reference signals, namely, a resource #1 for a first reference signal and a resource #2 for a first reference signal. If L=2, the $1^{st}$ second reference signal resource set includes resources for two second reference signals, namely, a resource #11 for a second reference signal and a resource #12 for a second reference signal. The $2^{nd}$ second reference signal resource set includes resources for two second reference signals, namely, a resource #21 for a second reference signal and a resource #22 for a second reference signal. A first reference signal carried on a resource #1 for the first reference signal and second reference signals carried on the resource #11 for the second reference signal and the resource #12 for the second reference signal meet the QCL relationship. A first reference signal carried on a resource #2 for the first reference signal and second reference signals carried on the resource #21 for the second reference signal and the resource #22 for the second reference signal meet the QCL relationship.

Optionally, if the type of the first reference signal resource set is the second type, the resources for the second reference signal included in the first reference signal resource set may be resources for SSBs.

It should be noted that, that the resource for the first reference signal and the resource for the second reference signal meet the QCL relationship may also be described as that the channel measurement resource and the interference measurement resource meet the QCL relationship. Alternatively, the channel measurement resource and the interference measurement resource use a same transmission configuration indicator (transmission configuration indicator, TO) state. A ICI is used to indicate QCL, information of a physical downlink control channel (Physical Downlink Control Channel, PDCCH)/a control resource se (CORESET), a physical downlink shared channel (Physical Downlink Shared Channel, PDSCH), or a target reference signal. TCI information means that a reference signal included in the TCI and a demodulation reference signal (demodulation reference signal. DMRS) of a PDCCH/a PDSCH or a target reference signal meet the QCL relationship, and is mainly used to indicate that when the PDCCH/the PDSCH/a reference signal (Reference Signal, RS) is received, information such as a spatial reception parameter of the PDCCH/the PDSCH/the reference signal is the same as, similar to, or approximate to information such as a spatial reception parameter of the reference signal included in the TCI. The target reference signal may be a tracking reference signal (Tracking Reference Signal, TRS), a CSI-RS, an SSB, a phase tracking reference signal (Phase Tracking Reference Signal, PTRS), or the like.

To improve efficiency of blindly detecting a control channel by the terminal device, the concept of a control resource set (control resource set, CORESET) is proposed in an NR standard formulation process. The network device may configure one or more resource sets for the terminal device, to send a PDCCH. The network device may send a control channel to the terminal device on any control resource set corresponding to the terminal device. In addition, the network device further needs to notify the terminal device of other configurations associated with the control resource set, for example, a search space set, Configuration information of all control resource sets varies. For example, frequency-domain widths vary, or time-domain lengths vary. It is extensible that the control resource set in this application may be a CORESET, a control region (control region), or an ePDCCH set (set) that is defined in a 5G mobile communication system.

If the type of the first reference signal resource set is the first type, it may be understood that the first reference signal resource set is a reference signal resource set having a same TCI state or same QCL. That reference signal resource set having the same TCI state/QCL means that all reference signals in the reference signal resource set have the same ICI states/QCL. If the type of the first reference signal resource set is the second type, it may be understood that the first reference signal resource set is a reference signal resource set having different TCI states or QCL. The reference signal resource sets having the different TCI states/QCL means that at least two reference signals in the reference signal resource set have the different TCI states/QCL.

Optionally, the type of the first reference signal resource set may not need to be indicated by the network device. For example, if the reference signal in the first reference signal resource set is an SSB, it may also be understood that the type of the first reference signal resource set is the first type.

Optionally, the resources for the M first reference signals included in the first reference signal resource set may also meet the QCL relationship. The resources for the $N_i$ second reference signals included in the $i^{th}$ second reference signal resource set may also meet the QCL relationship. Resources that are for second reference signals and that correspond to the resources for the first reference signals included in the first reference signal resource set may be the same or may be different. In this embodiment of this application, the QCL relationship may be predefined in a protocol, or configured by the network device.

The following describes a correspondence between the resource for the first reference signal in the first reference signal resource set and the resource for the second reference signal in the second reference signal resource se depending on whether the network device configures a TCI state (or QCL information) for the resource for the first reference signal in the first reference signal resource set and whether the network device configures a TCI state (or QCI, information for the resource for the second reference signal in the second reference signal resource set.

Case 1: The QCL information is configured for the resource for the first reference signal in the first reference signal resource set, and QCL information of resources for at least two first reference signals in the first reference signal resource set is different. The QCL information may be QCL-TypeD (QCL-TypeD) indicated by a TCI state. In other words, the TCI state is configured for the resource for the first reference signal in the first reference signal resource set, and TCI states of resources for at least two first reference signals in the first reference signal resource set are different.

In the foregoing case, resources for first reference signals having same QCL information correspond to a resource for one or more second reference signals. In other words, resources for first reference signals having same QCL information correspond to a resource for one or more same second reference signals. The resource for the first reference signal and the resource for the second reference signal that have a correspondence use same QCL information. In other words, the resource for the first reference signal and the resource for the second reference signal that have a correspondence meet the QCL relationship.

For example, the network device configures the resources for the M first reference signals and the resources for the N second reference signals. K pieces of different QCL information are configured in total for the resources for the M first reference signals, and K is an integer greater than or equal to 1. The resources for the N second reference signals are divided into K groups in total. Resources for first reference signals having same QCL information is grouped into one group. One group of resources for second reference signal correspond to one group of resources for first reference signals.

In some embodiments, if the resources for the N second reference signals are resources for reference signals in one second reference signal resource set, the resources for the N second reference signals are equally divided into K groups based on an indicated order of the resources for the second reference signals in the second reference signal resource set.

In some other embodiments, if the resources for the N second reference signals are resources for reference signals in K reference signal resource sets (for example, L=K), a $w^{th}$ second reference signal resource set corresponds to a $w^{th}$ group of resources for second reference signals w is an integer greater than or equal to 1 and less than or equal to K.

In some other embodiments, the resources for the N second reference signals are equally divided into K groups in ascending order of resource indexes of the N second reference signals.

In some other embodiments, the resources for the N second reference signals are equally divided into K groups in descending order of resource indexes of the N second reference signals.

It should be noted that "equally divided" may mean that each second reference signal resource group includes a same quantity of resources for second reference signals.

In some other embodiments, for the resources for the M first reference signals, resources for first reference signals having same QCL information are grouped into one group based on an order that is indicated by the network device and that is of the resources for the first reference signals in the first reference signal resource set. For example, M=4, and an order that is indicated by the network device and that is of the resources for the four first reference signals is: an NZP-CSI-RS-ResourceId 4, an NZP-CSI-RS-ResourceId 2, an NZP-CSI-RS-ResourceId 1, and an NZP-CSI-RS-ResourceId 3. QCL information of the four resources is QCI, information #1, QCL information #1, QCL information #2, and QCL information #2 respectively. In this case, the first group of resources for first reference signals include the resource for the $1^{st}$ first reference signal NZP-CSI-RS-ResourceId 4 and the resource for the $2^{nd}$ first reference signal NZP-CSI-RS-ResourceId 2. The third group of resources for first reference signals include the resource for the $3^{rd}$ first reference signal NZP-CSI-RS-ResourceId 1 and the resource for the $4^{th}$ first reference signal NZP-CSI-RS-ResourceId 3.

In some other embodiments, for the resources for the M first reference signals, resources for first reference signals having same QCL information are grouped into one group in ascending order of resource indexes of the first reference signals. For example, for ease of indication performed by the network device, the resource for the first reference signal is numbered by using #n. For example, M=4, and an order that is indicated by the network device and that is of the resources for the four first reference signals is: an NZP-CSI-RS-Resourced 4, an NZP-CSI-RS-ResourceId 2, an NZP-CSI-RS-ResourceId 1, and an NZP-CSI-RS-ResouceId 3. QCL information of the four resources is QCL information #1, QCI, information #1, QCL information #2, and QCL information 42 respectively. In this case, the first group of resources for first reference signals include the NZP-CSI-RS-ResourceId 1 and the NZP-CSI-RS-ResourceId 3. The second group of resources for first reference signals include the NZP-CSI-RS-ResourceId 2 and the NZP-CSI-RS-ResourceId 4.

It should be noted that a quantity of resources for first reference signal included in each first reference signal resource group may be the same as or different from one another.

A quantity of first reference signal resource groups may be equal to a quantity of second reference signal resource groups. A $w^{th}$ group of resources for first reference signals may correspond to the $w^{th}$ group of the resources for the second reference signals.

In a possible implementation, no TCI state (or QCI, information) is configured for the resource for the second reference signal. In this case, the terminal device receives the $w^{th}$ group of the resources for the second reference signals by using QCI, information of the $w^{th}$ group of the resources for the first reference signals. Alternatively, the first reference signal resource group and the second reference signal resource group that have a correspondence use same QCL information. Alternatively, a resource for a first reference signal and a resource for a second reference signal that have a correspondence meet the QCL relationship. Alternatively, a resource for a second reference signal in the second reference signal resource group and the corresponding first reference signal resource group meet the QCL relationship. Alternatively, a resource for a second reference signal in the second reference signal resource group and the corresponding first reference signal resource group use same QCL information. Alternatively, the terminal device receives a second reference signal in the second reference signal resource group by using QCL information of the corresponding first reference signal resource group.

In another possible implementation, a TCI state (or QCL information) is configured for the resource for the second reference signal, but the terminal device ignores the QCI, information of the resource for the second reference signal. The terminal device receives the second reference signal on the resource for the second reference signal by using QCL information of a resource that is for a first reference signal and that has a correspondence with the resource for the second reference signal. Specifically, the terminal device receives the $w^{th}$ group of the resources for the second reference signals by using QCL information of the $w^{th}$ group of the resources for the first reference signals. Alternatively, a resource for a second reference signal in the second reference signal resource group and the corresponding first reference signal resource group meet the QCL relationship. Alternatively, a resource for a second reference signal in the second reference signal resource group and the corresponding first reference signal resource group use same QCL information. Alternatively, the terminal device receives a second reference signal in the second reference signal resource group by using QCL information of the corresponding first reference signal resource group.

Figure 10A:
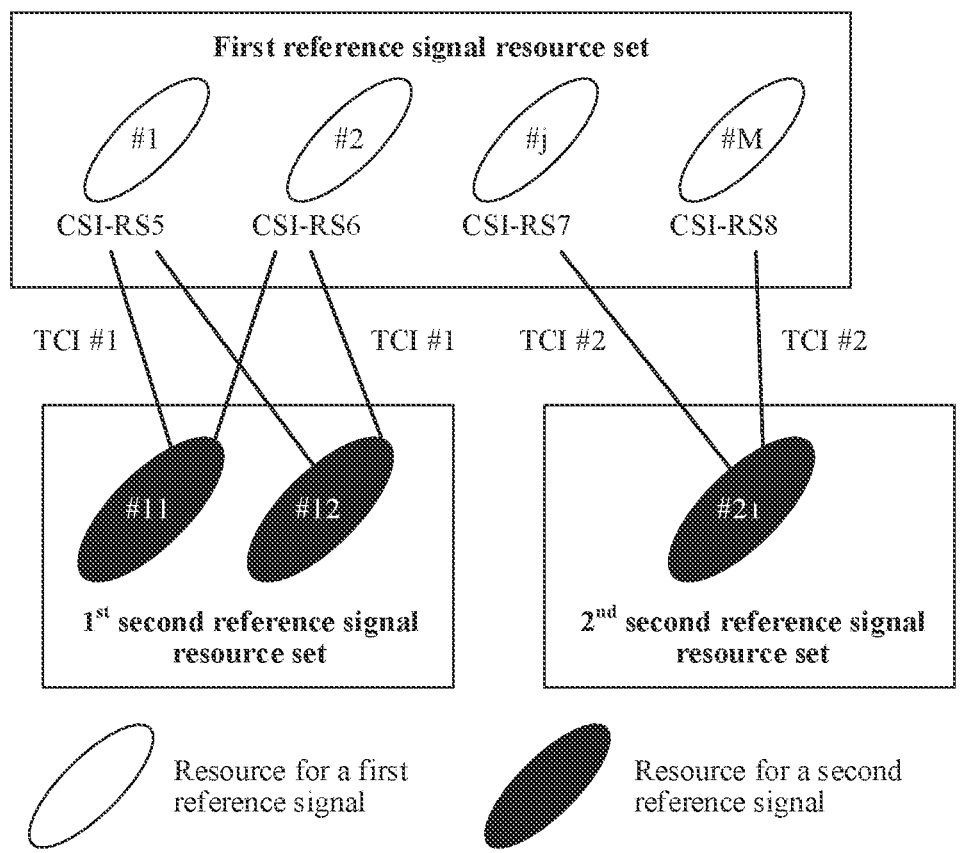
FIG. 10A is an example diagram of yet another resource configuration according to an embodiment of this application.

For example, as shown in FIG. 10A, a base station configures resources for four first reference signals, namely, a CSI-RS 5, a CSI-RS 6, a CSI-RS 7, and a CSI-RS 8. A TCI state configured for the CSI-RS 5 is a TCI stateId #1 (TCI #1 for short), a TCI state configured for the CSI-RS 6 is the TCI #1, a TCI state configured for the CSI-RS 7 is a TCI#2, and a TCI state configured for the CSI-RS 8 is the TCI #2. Resources for the first reference signals for which the TCI #1 is configured correspond to the $1^{st}$ second reference signal resource set. The second reference signal resource set includes resources for two second reference signals, namely, a resource #11 for a second reference signal and a resource #12 for a second reference signal. Resources for the first reference signals for which the TCI #2 is configured correspond to the 2nd second reference signal resource set. The $2^{nd}$ second reference signal resource set includes a resource for one second reference signal, namely, a resource #21 for a second reference signal. The terminal device separately calculates the L1-SINR (for example, the CSI-RS 5, the resource #11 for the second reference signal, and the resource #12 for the second reference signal) from a resource for a first reference signal and a resource for a second reference signal that have a correspondence. Optionally, if a resource for one first reference signal corresponds to resources for a plurality of second reference signals, the terminal device may further select a resource for one or more first reference signals from the resources for the plurality of second reference signals as an interference resource to calculate the L1-SINR.

Case 2: It is assumed that no TCI state (or QCL information) is configured for the resource for the first reference signal in the first reference signal resource set, and no TCI state (or QCL information is configured for the resource for the second reference signal in the second reference signal resource set. In this case, the resources for all the first reference signals and the resources for all the second reference signals may meet the QCL relationship. Alternatively, a correspondence between the resource for the first reference signal and the resource for the second reference signal may be determined by the terminal device. For each resource that is for a first reference signal and that is used for channel measurement, the terminal device may randomly, select a resource for one or more second reference signals from the second reference signal resource set as an interference resource to calculate the corresponding L1-SINK.

Case 3: It is assumed that no TCI state (or QCL information) is configured for the resource for the first reference signal in the first reference signal resource set, and a TCI state (or QCL information) is configured for the resource for the second reference signal in the second reference signal resource set. In this case, the terminal device ignores the TCI state of the resource for the second reference signal.

In some embodiments, the resources for all the first reference signals and resources for all the second reference signals may meet the QCL relationship. Alternatively, a correspondence between the resource for the first reference signal and the resource for the second reference signal may be determined by the terminal device. For each resource that is for a first reference signal and that is used for channel measurement, the terminal device may randomly select a resource for one or more second reference signals from the second reference signal resource set as an interference resource to calculate the corresponding L1-SINR (the resource for the first reference signal and the resource for the second reference signal that have the correspondence may use same QCL information).

Case 4: It is assumed that a TCI state is configured for the resource for the first reference signal in the first reference signal resource set, and TCI states (or QCL information) of the resources for all the first reference signal in the first reference signal resource set are the same. No TCI state (or QCL information) is configured for the resource for the second reference signal in the second reference signal resource set. In this case, the terminal device receives the second reference signal on the resource for the second reference signal by using QCL information of the resource for the first reference signal. Specifically, the terminal device receives the resource for the second reference signal by using the QCL information of the resource for the first reference signal. Alternatively, the resource for the second reference signal and the corresponding resource for the first reference signal meet the QCL relationship. Alternatively, the resource for the second reference signal and the corresponding resource for the first reference signal use same QCL information. Alternatively, the terminal device receives the second reference signal on the resource for the second reference signal by using the QCL information of the corresponding resource for the first reference signal.

In some embodiments, the resources for all the first reference signals and resources for all the second reference signals may meet the QCL relationship, or a correspondence between the resource for the first reference signal and the resource for the second reference signal may be determined by the terminal device. For each resource that is for a first reference signal and that is used for channel measurement, the terminal device may randomly select a resource for one or more second reference signals from the second reference signal resource set as an interference resource to calculate the corresponding L1-SINR (the resource for the first reference signal and the resource for the second reference signal that have the correspondence may use same QCL information).

Case 5: It is assumed that a TCI state (or QCL information) is configured for the resource for the first reference signal in the first reference signal resource set, and a TCI state (or QCL, information) is also configured for the resource for the second reference signal in the second reference signal resource set.

In some embodiments, there is a correspondence between a resource for a first reference signal and a resource for a second reference signal that have a same TCI state (or QCL information).

In some other embodiments, the terminal device ignores the TCI state (or the QCL, information) of the resource for the second reference signal, and the terminal device receives the second reference signal by using QCL information of a corresponding resource for a first reference signal. Alternatively, the resource for the second reference signal and a corresponding resource for a first reference signal meet the QCL relationship. Alternatively, the resource for the second reference signal and a corresponding resource for a first reference signal use same QCL information. Alternatively, the terminal device receives the second reference signal on the resource for the second reference signal by using QCL information of a corresponding resource for a first reference signal. In this case, the correspondence between the resource for the first reference signal and the resource for the second reference signal may be configured by the network device, or predefined in a protocol, or reported by the terminal device.

It should be noted that the foregoing several cases may all exist, or only some cases exist, or the terminal device does not expect some configurations, for example, the terminal device does not expect the case 3.

In some embodiments, for the case 2, the case 3, the case 4, and the case 5, there may be the following possible correspondences between the resources for the M first reference signals and the resources for the N second reference signals that are configured by the network device.

Correspondence 1: The resources for the N second reference signals are divided into M groups in total. A resource for an first reference signal corresponds to an second reference signal resource group, i is an integer greater than or equal to 1 and less than or equal to M.

In some embodiments, if the resources for the N second reference signals are resources for second reference signals in one second reference signal resource set, the resources for the N second reference signals are equally divided into K groups based on an indicated order of the resources for the second reference signals in the second reference signal resource set.

In some other embodiments, if the resources for the N second reference signals are resources for second reference signals in K second reference signal resource sets (for example, L=K), a $w^{th}$ second reference signal resource set corresponds to a $w^{th}$ group of resources for second reference signals. w is an integer greater than or equal to 1 and less than or equal to K.

In some other embodiments, the resources for the N second reference signals are equally divided into K groups in ascending order of resource indexes of the N second reference signals.

In some other embodiments, the resources for the N second reference signals are equally divided into K groups in descending order of resource indexes of the N second reference signals.

A quantity of resources for first reference signal may be equal to a quantity of second reference signal resource groups. A $w^{th}$ resource for a first reference signal may correspond to the $w^{th}$ group of the resources for the second reference signals.

Correspondence 2: The resources for the M first reference signals are divided into N groups in total. An $i^{th}$ group of resources for reference signals correspond to a resource for an second reference signal. i is an integer greater than or equal to 1 and less than or equal to N.

In some embodiments, if the resources for the M first reference signals are resources for reference signals in one reference signal resource set, the resources for the M first reference signals are equally divided into N groups based on an indicated order of the reference signal resources in the reference signal resource set.

In some other embodiments, if the resources for the M first reference signals are resources for reference signals in N reference signal resource sets, a $w^{th}$ reference signal resource set corresponds to a $w^{th}$ group of resources for first reference signals. w is an integer greater than or equal to 1 and less than or equal to N.

In some other embodiments, the resources for the M first reference signals are equally divided into N groups in ascending order of resource indexes of the M first reference signals.

In some other embodiments, the resources for the M first reference signals are equally divided into N groups in descending order of resource indexes of the M first reference signals.

A quantity of first reference signal resource groups may be equal to a quantity of resources for second reference signals, A $w^{th}$ first reference signal resource group may correspond, to a $w^{th}$ resource for a second reference signal.

Correspondence 3: The resources for the M first reference signals are divided into P groups in total, and the resources for the N second reference signals are divided into P groups in total. An $i^{th}$ group of resources for first reference signals correspond to an $i^{th}$ group of resources for second reference signals. i is an integer greater than or equal to 1 and less than or equal to P, and P is an integer greater than or equal to 1.

In some embodiments, if the resources for the M first reference signals are resources for reference signals in one reference signal resource set, the resources for the M first reference signals are equally divided into P groups in an indicated order of the reference signal resources in the reference signal resource set.

In some other embodiments, if the resources for the M first reference signals are resources for reference signals in P reference signal resource sets, a $w^{th}$ reference signal resource set corresponds to a $w^{th}$ group of resources for first reference signals. w is an integer greater than or equal to 1 and less than or equal to P.

In some other embodiments, the resources for the M first reference signals are equally divided into P groups in ascending order of resource indexes of the M first reference signals.

In some other embodiments, the resources for the M first reference signals are equally divided into P groups in descending order of resource indexes of the M first reference signals.

In some embodiments, if the resources for the N second reference signals are resources for second reference signals in one second reference signal resource set, the resources for the N second reference signals are equally divided into P groups based on an indicated order of the resources for the second reference signals in the second reference signal resource set.

In some other embodiments, if the resources for the N second reference signals are resources for second reference signals in P second reference signal resource sets (for example, L=P), a $w^{th}$ second reference signal resource set corresponds to a $w^{th}$ group of resources for second reference signals. w is an integer greater than or equal to 1 and less than or equal to P.

In some other embodiments, the resources for the N second reference signals are equally divided into P groups in ascending order of resource indexes of the N second reference signals.

In some other embodiments, the resources for the N second reference signals are equally divided into P groups in descending order of resource indexes of the N second reference signals.

A quantity of first reference signal resource groups may be equal to a quantity of second reference signal resource groups, A $w^{th}$ first reference signal resource group may correspond to a $w^{th}$ second reference signal resource group. w is an integer greater than or equal to 1 and less than or equal to P.

It should be noted that, in this embodiment of this application, the correspondence between the resource for the first reference signal and the resource for the second reference signal may be configured by the network device, or may be predefined in a protocol, or may be reported by the terminal device. The resource for the first reference signal and the resource for the second reference signal that have the correspondence meet the QCL relationship, or the resource for the first reference signal and the resource for the second reference signal that have the correspondence use same QCL information. The terminal device acquires channel state information based on the resource for the first reference signal and the resource for the second reference signal that have the correspondence.

It may be understood that the QCL information in this embodiment of this application may be QCL-TypeD information. The QCL information may be indicated by a TCI state.

It should be noted that a repetition parameter of the second reference signal resource set is configured in the following possible implementation: A repetition (repetition) field of the second reference signal resource set is the same as the repetition (repetition) field of the type of the first reference signal resource set; or no repetition (repetition) field is configured for the second reference signal resource set. In other words, a type of the second reference signal resource set is the same as the type of the first reference signal resource set; or no type is configured for the second reference signal resource set.

For example, when a repetition parameter of the first reference signal resource set is "off", the repetition parameter of the second reference signal resource set also needs to be "off".

For another example, when a repetition parameter of the first reference signal resource set is "off", no repetition parameter is configured for the second reference signal resource set.

It should be understood that a type of a reference signal resource set includes the first type and the second type. The first type is used to indicate that reference signals in the reference signal resource set use different downlink spatial transmission filters (spatial domain transmission filter). "Reference signals use different downlink spatial transmission filters" may mean that the terminal device does not assume that a same spatial filter is used. To be specific, at least two reference signals use different spatial transmission filters. The network device may configure a repetition (replication) field of the reference signal resource set to "off" by using higher layer signaling for example, RRC signaling), to indicate that the type of the reference signal resource set is the first type. The reference signal resource set of the first type may be a resource set for NZP CSI-RSs. The reference signal resource set of the first type may be used by the terminal device to train a transmit beam on a network device side. The second type is used to indicate that the reference signals in the reference signal resource set use a same downlink spatial transmission filter. The network device may configure a repetition replication) field of the first reference signal resource set to "on" by using higher layer signaling (for example, RRC signaling), to indicate that the type of the reference signal resource set is the second type. The reference signal resource set of the second type may be used by the terminal device to train a receive beam on a terminal device side.

It should be noted that the type of the reference signal resource set may be configured by the network device, or may be determined by the terminal device based on the resource configuration information. The first type may also be used to indicate that resources for the reference signals in the reference signal resource set use the different downlink spatial transmission filters. The second type may also be used to indicate that the resources for the reference signals in the reference signal resource set use the same downlink spatial transmission filter.

In addition, the resource configuration information may include an index of the first reference signal resource set, indexes of the L second reference signal resource sets, and type information of the first reference signal resource set, to indicate the first reference signal resource set, the L second reference signal resource sets, and the type of the first reference signal resource set. A specific indication manner may alternatively be another manner. This is not limited in this embodiment of this application.

Optionally, the resource configuration information may be further used to indicate a correspondence between the resource for the first reference signal in the first reference signal resource set and the resource for the second reference signal in the second reference signal resource set. Resources for a plurality of first reference signals may correspond to a resource for a same second reference signal. Alternatively, resources that are for a plurality of second reference signals and that correspond to resources for a plurality of first reference signals are the same. A plurality of channel measurement resources share one interference measurement resource set. The terminal device may select an interference measurement resource from the interference measurement resource set for each channel measurement resource, to calculate an L1-SINR. Alternatively, resources that are for a plurality of second reference signals and that correspond to resources for a plurality of first reference signals are different.

The resource configuration information may alternatively be used to configure at least two first reference signal resource sets. Each first reference signal resource set is used to measure a channel. A resource for a first reference signal in each first reference signal resource set may correspond to the resource for the second reference signal in the L second reference signal resource sets. For a specific correspondence, refer to the foregoing descriptions. Details are not described herein in this application. In this case, the resource for the first reference signal may also be numbered by using #xy. For example, in the $1^{st}$ first reference signal resource set, #11 represents a resource for the $1^{st}$ first reference signal in the $1^{st}$ first reference signal resource set, and #12 represents a resource for the $2^{nd}$ first reference signal in the $1^{st}$ first reference signal resource set. In the $2^{nd}$ first reference signal resource set, #21 represents a resource of the $1^{st}$ first reference signal in the $2^{nd}$ first reference signal resource set, and #22 represents a resource for the $2^{nd}$ first reference signal in the $2^{nd}$ first reference signal resource set.

For a plurality of CMRs in a beam training process, the network device needs to configure a corresponding IMR for each channel measurement resource. A CMR may be used as a signal, and an IMR that has a correspondence with the CMR is used as interference to calculate a corresponding L1-SINR. However, for a user, a plurality of types of interference need to be considered, for example, inter-cell interference and inter-multi-beam (multi-beam) interference. In this case, a plurality of interference measurement resources need to be configured for the channel measurement resource. In this embodiment of this application, M may be equal to L, or M is not equal to L. For example, M may be greater than L. When the first reference signal resource set is of the first type, the resource for the first reference signal is used for training of the transmit beam on the network device side. The receive beam on the terminal device side is approximately the same. The terminal device may receive the interference resources by using a same receive beam, Therefore, a plurality of channel measurement resources may share a set of the interference measurement resources. For example, the resources for the M first reference signals may share resources for second reference signals in the L second reference signal resource sets. Therefore, resource overheads for configuring the interference resources are effectively reduced.

S502: The terminal device receives the resource configuration information sent by the network device.

For a detailed explanation of the resource configuration information, refer to the descriptions in S501. Details are not described herein again in this embodiment of this application.

S503: The terminal device determines the channel state information based on the resource for the $j^{th}$ first reference signal and the resource that is for the second reference signal and that corresponds to the resource for the $j^{th}$ first reference signal.

The terminal device may use first signal quality measured on the resource for the $j^{th}$ first reference signal as a signal item and use second signal quality measured on the resource that is for the second reference signal and that corresponds to the resource for the $j^{th}$ first reference signal as an interference item. The terminal device determines channel quality based on the signal item and the interference item, and uses the channel quality as content of the channel state information. The signal quality may be signal power, for example, reference signal received power (reference signal received power, RSRP). The signal quality may alternatively be signal strength, for example, reference signal received strength. The signal quality may alternatively be signal energy or the like. It should be understood that the signal power in this embodiment of this application may be replaced with signal quality such as the signal strength, the signal energy, a signal to interference plus noise ratio (signal to interference plus noise ratio, SINR), a signal-to-noise ratio (signal-noise ratio, SNR), a channel quality indicator (channel quality indicator, CQI), or reference signal received quality (Reference signal received quality, RSRQ).

In an optional implementation, the terminal device may first acquire a first signal power and a second signal power. The first signal power is acquired based on a signal power of the $j^{th}$ first reference signal, and the first signal power may be the signal power of the $j^{th}$ first reference signal. The second signal power is acquired based on a signal power of the second reference signal on the resource that is for the second reference signal and that corresponds to the resource for the $j^{th}$ first reference signal, and the second signal power may be the signal power of the second reference signal on the resource that is for the second reference signal and that corresponds to the resource for the $j^{th}$ first reference signal. Then, the first signal power may be used as a signal term, and the second signal power may be used as an interference term, to acquire channel quality. For example, the SINR is determined based on the first signal power and the second signal power, and the signal to interference plus noise ratio may be determined by using the following formula:

$$SINR = \frac{S}{I},$$

where S represents the first signal power, and I represents the second signal power.

For resources for different second reference signals, values of the second signal power may also be different. For the resources for the different second reference signals, the following describes the values of the second signal power in detail.

Manner 1: When L=1, the second reference signal is the CSI-IM, and the resource for the second reference signal is the resource for the CSI-IM, the second signal power is acquired based on an average value of signal powers of CSI-IM on resources that are for second reference signals and that correspond to the resource for the $j^{th}$ first reference signal. For example, the second signal power is the average value of the signal powers of the CSI-IM on the resources that are for the second reference signals and that correspond to the resource for the $j^{th}$ first reference signal. For example, as shown in (a) in FIG. 6, the resource for the $j^{th}$ first reference signal is associated with the resource #11 for the second reference signal and the resource #12 for the second reference signal, and the second signal power is an average value of a signal power of CSI-IM on the resource #11 for the second reference signal and a signal power of CSI-IM on the resource #12 for the second reference signal. As shown in (a) in FIG. 8, the resource for the $j^{th}$ first reference signal is associated with the resource #11 for the second reference signal and the resource #21 for the second reference signal, and the second signal power is an average value of a signal power of CSI-IM on the resource #11 for the second reference signal and a signal power of CSI-IM on the resource #21 for the second reference signal. It should be noted that the average value of the signal powers of the CSI-IM may be an average value of values acquired after the signal powers of the CSI-IM are rounded up or rounded off. For example, the acquired signal powers of the CSI-IM include 3.1, 3.2, and 6.1, and an average value of 3, 3, and 6 may be calculated. That is, (3+3+1)/3=4. Alternatively, the average value of the signal powers of the CSI-IM may be an unquantized average value, a quantized average value, or the like. This is not limited in this application.

Manner 2: When L=1, the second reference signal is the NZP-CSI-RS, and the resource for the second reference signal is the resource for the NZP-CSI-RS, the second signal power is acquired based on a sum of signal powers of NZP-CSI-RSs on resources that are for second reference signals and that correspond to the resource for the $j^{th}$ first reference signal. For example, the second signal power is the sum of the signal powers of the NZP-CSI-RSs on the resources that are for the second reference signals and that correspond to the resource for the $j^{th}$ first reference signal. For example, as shown in (a) in FIG. 6, the resource for the $j^{th}$ first reference signal is associated with the resource #11 for the second reference signal and the resource #12 for the second reference signal, and the second signal power is a sum of a signal power of NZP-CSI-RS on the resource #11 for the second reference signal and a signal power of NZP-CSI-RS on the resource #12 for the second reference signal. As shown in (a) in FIG. 8, the resource for the $j^{th}$ first reference signal is associated with the resource #11 for the second reference signal and the resource #21 for the second reference signal, and the second signal power is a sum of a signal power of NZP-CSI-RS on the resource #11 for the second reference signal and a signal power of NZP-CSI-RS on the resource #21 for the second reference signal.

It may be understood that, in a possible implementation, in the foregoing manner, L may alternatively not be equal to 1.

Manner 3: When L is greater than 1, and the resources for the second reference signals in the L second reference signal resource sets include the resource for the NZP-CSI-RS and the resource for the CSI-IM, the second signal power is acquired based on a signal power of CSI-IM and a signal power of the NZP-CSI-RS, where the CSI-IM and the NIP-CSI-RS are on resources that are for second reference signals and that correspond to the resource for the $j^{th}$ first reference signal. For example, the second signal power is a sum of the signal power of the CSI-IM and the signal power of the NZP-CSI-RS, where the CSI-IM and the NZP-CSI-RS are on the resources that are for the second reference signals and that correspond to the resource for the $j^{th}$ first reference signal. For example, as shown in (b) in FIG. 6, the resource for the $j^{th}$ first reference signal is associated with the resource #11 for the second reference signal, the resource #12 for the second reference signal, the resource #21 for the second reference signal, and the resource #22 for the second reference signal. It is assumed that the resource #11 for the second reference signal and the resource #12 for the second reference signal are resources for NZP-CSI-RSs, and the resource #21 for the second reference signal and the resource #22 for the second reference signal are resources for CSI-IM. The second signal power is a sum of signal powers of the NZP-CSI-RSs on the resource #11 for the second reference signal and the resource #12 for the second reference signal and signal powers for CSI-IM on the resource #21 for the second reference signal and the resource #22 for the second reference signal. For a manner of calculating the signal power of the CSI-IM, refer to the descriptions in Manner 1 above. For a manner of calculating the signal power of the NZP-CSI-RS, refer to the descriptions in Manner 2 above. Details are not described herein again in this embodiment of this application.

In addition, optionally, the terminal device may obtain, based on the foregoing method, M signal to interference plus noise ratios for the first reference signals on the resources for the M first reference signals and second reference signals corresponding to the M first reference signals. Alternatively, the terminal device may obtain, based on a capability of the terminal device, some signal to interference plus noise ratios for first reference signals on resources for a part of the M first reference signals and second reference signals corresponding to the some first reference signals. For example, M=64. The terminal device may acquire 64 signal to interference plus noise ratios through measurement for first reference signals on resources for 64 first reference signals and second reference signals corresponding to the 64 first reference signals. Alternatively, the terminal device may acquire 12 signal to interference plus noise ratios through measurement for first reference signals on resources for 12 first reference signals and second reference signals corresponding to the 12 first reference signals.

It should be noted that the channel state information may include a resource index of a first reference signal and first channel quality. Alternatively, the channel state information may include a resource index of a first reference signal, a resource index of a second reference signal, and first channel quality. Alternatively, the channel state information may include a resource index of a first reference signal, a resource index of a second reference signal, first channel quality, and second channel quality.

Optionally, the terminal device may report a plurality of pieces of channel state information.

Optionally, the first reference signal and the second reference signal that are used to determine channel quality are reference signals that can be received simultaneously.

It should be understood that in this embodiment of this application, simultaneity refers to receiving at a same moment, or receiving at an overlapping moment, or receiving in a same time unit, or receiving in least one overlapping time unit, and the M reference signals overlap in at least one time unit. The time unit may be one or more radio frames, one or more subframes, one or more slots, one or more mini slots (mini slot), or one or more orthogonal frequency division multiplexing (orthogonal frequency division multiplexing, OFDM) symbols defined in an LIE, system or a 5G NR system, or may be a time window including a plurality of frames or subframes, for example, a system information (system information, SI) window. The following embodiment is described by using an example in which the reference signals that are simultaneously received are reference signals received on one or more OFDM symbols. This is not limited in this application.

The resource index of the first reference signal may be an index corresponding to a first reference signal resource carrying the first reference signal, for example, an index of the resource for the $j^{th}$ first reference signal in the first reference signal resource set.

The resource index of the second reference signal may be an index corresponding to a second reference signal resource carrying the second reference signal, for example, an index corresponding to the resource that is for the second reference signal, corresponds to the resource for the $j^{th}$ first reference signal, and in the second reference signal resource set. A plurality of interference sources may exist for one first reference signal, and the terminal device may measure a plurality of types of interference for a plurality of second reference signals corresponding to the first reference signal. Therefore, the channel state information may include resource indexes of the plurality of second reference signals. For example, when multi-layer/multi-beam (multi-beam)/ multi-TRP (for example, NCJT) transmission is supported, the terminal device may select a plurality of interference sources or an interference source used to measure different types of interference.

It should be noted that the quantity of resource indexes, reported by the terminal device, of first reference signals and a quantity of resource indexes, reported by the terminal device, of second reference signals may be preconfigured by the network device, or predefined in a protocol, or reported by the terminal device. This is not limited in this application. Optionally, the terminal device may further report an index of a first reference signal resource set to which a first reference signal belongs and an index of a second reference signal resource set to which a second reference signal belongs. For example, a resource index of one or more second reference signals is reported.

The first channel quality may be acquired by measuring a first reference signal and a second reference signal. Reference signal received strength, a reference signal received power, or reference signal energy that is measured on the first reference signal may be used as a signal, and reference signal received strength, a reference signal received power, or reference signal energy that is measured on the second reference signal may be used as interference. Alternatively, the first channel quality is acquired by measuring a first reference signal, a second reference signal, and a third reference signal. The third reference signal may be a reference signal on a resource for a reference signal other than the resource for the first reference signal in the first reference signal resource set. Alternatively, the third reference signal may be a reference signal on a resource for a reference signal other than the resource for the second reference signal in the second reference signal resource set. Alternatively, the third reference signal may be a reference signal in a reference signal resource set other than the first reference signal resource set and the second reference signal resource set. Optionally, reference signal received strength, a reference signal received power, or reference signal energy that is acquired through measurement on the third reference signal may be used as interference.

The second channel quality may be acquired by measuring a first reference signal and a second reference signal. Reference signal received strength, a reference signal received power, or reference signal energy that is measured on the first reference signal may be used as interference, and reference signal received strength, a reference signal received power, or reference signal energy that is measured on the second reference signal may be used as a signal. Alternatively, the second channel quality is acquired by measuring a first reference signal, a second reference signal, and a third reference signal. The third reference signal may be a reference signal on a resource for a reference signal other than the resource for the first reference signal in the first reference signal resource set. Alternatively, the third reference signal may be a reference signal on a resource for a reference signal other than the resource for the second reference signal in the second reference signal resource set. Optionally, reference signal received strength, a reference signal received power, or reference signal energy that is acquired through measurement on the third reference signal may be used as interference.

Optionally, the channel quality may be an SINR, an SNR, a CQI, RSRQ, or the like. This is not limited in this application.

Optionally, when the IMR is a resource for an NZP CSI-RS, the terminal device may select different IMR resources or IMR resource combinations as interference items based on different interference assumptions, to calculate the L1-SINR, and report an index of the IMR to the network device.

S504: The terminal device sends the channel state information to the network device.

A quantity of pieces of channel state information reported by the terminal device depends on a configuration of the network device, predefinition in the protocol, or reporting of the terminal device. This is not limited in this embodiment of this application. For example, if M=64, and the network device configures that the terminal device reports four pieces of channel state information, the terminal device reports the four pieces of channel state information. Each piece of channel state information may include at least one of the resource index of the first reference signal, the resource index of the second reference signal, the first channel quality, and the second channel quality. Specific possible reporting combinations are described above, and details are not described herein again.

S505: The network device receives the channel state information sent by the terminal device.

For a detailed explanation of the channel state information, refer to the descriptions in S504. Details are not described herein again in this embodiment of this application.

In this embodiment of this application, because the resources for the M first reference signals may share the resource for the second reference signal in the L second reference signal resource sets, calculation complexity of measuring interference by the terminal device based on the interference measurement resource is effectively reduced, and resource overheads for reporting the channel state information are reduced.

In the foregoing embodiment, the network device indicates the first reference signal resource set, the L second reference signal resource sets, and the type of the first reference signal resource set by using the resource configuration information. In another possible implementation, the network device may alternatively directly configure the first reference signal resource set, the L second reference signal resource sets, and the type of the first reference signal resource set, and the terminal device determines the channel state information based on the correspondence between the resource for the first reference signal and the resource for the second reference signal in the foregoing embodiment. Alternatively, the network device may configure the first reference signal resource set, the L second reference signal resource sets, and the correspondence between the resource for the first reference signal and the resource for the second reference signal.

Figure 11:
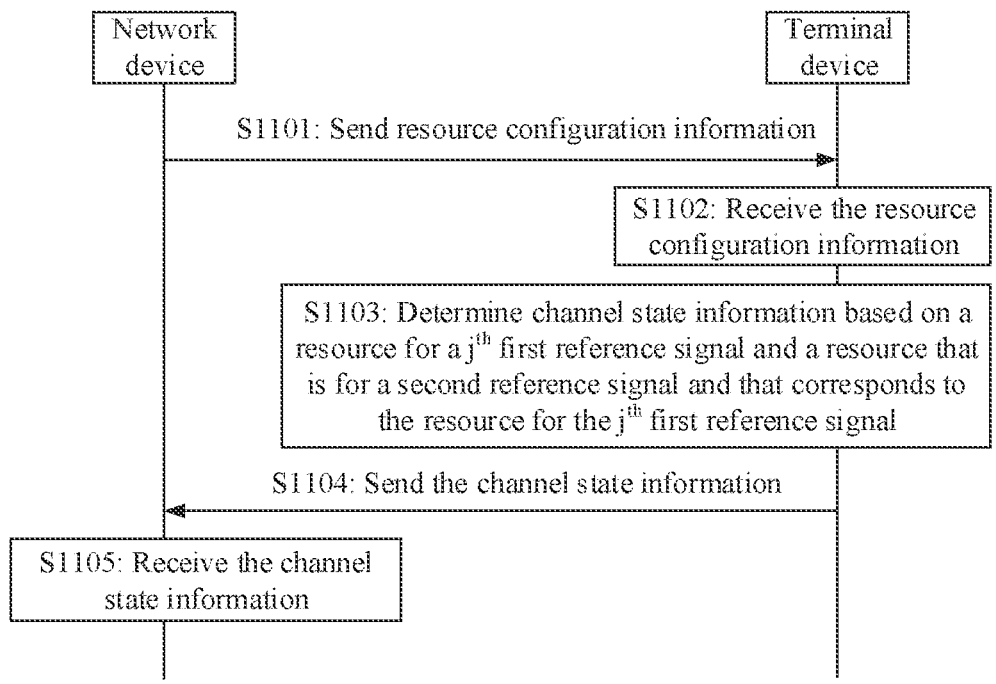
FIG. 11 is a flowchart of another resource indication method according to an embodiment of this application.

For example, FIG. 11 is a flowchart of another resource indication method according to an embodiment of this application. As shown in FIG. 11 the method may include the following steps.

S1101: A network device sends resource configuration information to a terminal device.

The resource configuration information is used to indicate a first reference signal resource set, L second reference signal resource sets, and information about a spatial correlation parameter. The first reference signal resource set includes resources for M first reference signals, the resource for the first reference signal is used to measure a channel, an $i^{th}$ second reference signal resource set includes resources for $N_i$ second reference signals, the resource for the second reference signal is used to measure interference. M is an integer greater than 1, L is an integer greater than or equal to 1, i is an integer greater than or equal to 1 and less than or equal to L, and $N_i$ is an integer greater than or equal to 1.

The information about the spatial correlation parameter includes a transmission configuration indicator state of the first reference signal and a transmission configuration indicator state of the second reference signal. Alternatively, the information about the spatial correlation parameter includes QCL information of the first reference signal and quasi co-location QCL information of the second reference signal. Alternatively, the information about the spatial correlation parameter includes QCL information of the first reference signal, or the information about the spatial correlation parameter includes QCL information of the second reference signal.

For detailed explanations of the first reference signal resource set and the second reference signal resource set, refer to the descriptions in S501, Details are not described in this embodiment of this application again.

S1102: The terminal device receives the resource configuration information sent by the network device.

For a detailed explanation of the resource configuration information, refer to the descriptions in S1101. Details are not described herein again in this embodiment of this application.

S1103: The terminal device determines channel state information based on a resource for a $j^{th}$ first reference signal and a resource that is for a second reference signal and that corresponds to the resource for the first reference signal.

j is an integer greater than or equal to 1 and less than or equal to M. For an explanation of the channel state information and a process of determining the channel quality, refer to the detailed descriptions in S503. A difference from S503 lies in that the resource that is for the second reference signal and that corresponds to the resource for the $j^{th}$ first reference signal is determined based on the spatial correlation parameter. For example, the resource that is for the second reference signal and that corresponds to the resource for the $j^{th}$ first reference signal is determined based on a resource that is for a second reference signal and that meets a QCL relationship with the resource for the $j^{th}$ first reference signal, or the resource that is for the second reference signal and that corresponds to the resource for the $j^{th}$ first reference signal is determined based on a resource that is for a second reference signal and that has a same transmission configuration indicator state as the resource for the $j^{th}$ first reference signal.

S1104: The terminal device sends the channel state information to the network device.

S1105: The network device receives the channel state information sent by the terminal device.

In this embodiment of this application, because the resources for the M first reference signals may share the resource for the second reference signal in the L second reference signal resource sets, calculation complexity of measuring interference by the terminal device based on an interference measurement resource is effectively reduced, and resource overheads for reporting the channel state information are reduced.

Optionally, when a second signal power of an L1-SINR is calculated, in addition to being acquired from the interference measurement resource, a part of interference may be further acquired from the channel measurement resource for the first reference signal. Optionally, a first part of interference may be acquired from the interference measurement resource, and a second part of interference may be acquired from the channel measurement resource. The terminal device determines the L1-SINR based on a first signal power acquired through measurement on the channel measurement resource, the first part of interference on the interference measurement resource, and the second part of interference on the channel measurement resource.

Particularly, in this application, an interference measurement resource configured by the network device may also be a channel measurement resource. That is, a second reference signal resource set configured by the network device may also be used as channel measurement resources. For example, the network device configures at least two first reference signal resource sets, and the at least two first reference signal resource sets are used as channel measurement resources. Optionally, the channel state information reported by the terminal device may include an index of a resource for a first reference signal in the $1^{st}$ first reference signal resource set and an index of a resource for a first reference signal in the $2^{nd}$ first reference signal resource set. The first channel measurement resource is used as a signal, the second channel measurement resource is used as interference, and an L1-SINR 1 is acquired through calculation. Alternatively, the first channel measurement resource is used as interference, the second channel measurement resource is used as a signal, and an L1-SINR 2 is acquired through calculation. Alternatively, the network device configures at least one first reference signal resource set and at least one second reference signal resource set. The at least one first reference signal resource set is used as a channel measurement resource, and the at least one second reference signal resource set is used as a channel measurement resource. Optionally, the channel state information reported by the terminal device may include an index of a resource for a first reference signal in the first reference signal resource set and an index of a resource for a second reference signal in the second reference signal resource set. The first channel measurement resource is used as a signal, the second channel measurement resource is used as interference, and an L1-SINR 1 is acquired through calculation. Alternatively, the first channel measurement resource is used as interference, the second channel measurement resource is used as a signal, and an L1-SINR 2 is acquired through calculation. Optionally, in this case, the two channel measurement resources may be included in a same resource configuration or different resource configurations. Optionally, the network device may further configure one or more interference measurement resources that are also used for interference measurement. The OCL relationship may be configured by the network device or predefined in a protocol. In addition, this embodiment of this application may be applied to a beam management (Beam management) or beam training (Beam training) phase, or may be applied to a CSI acquisition (acquisition) phase, namely, COI measurement or a precoding matrix indicator (Precoding Matrix Indicator, PMI) measurement and/or reporting phase.

For uplink transmission, the network device may preconfigure the first reference signal resource set, the L second reference signal resource sets, and the type of the first reference signal resource set. The first reference signal resource set may include the resources for the M first reference signals. The resource for the first reference signal is used to measure the channel. M is an integer greater than 1. L is an integer greater than or equal to 1. The $i^{th}$ second reference signal resource set may include the resources for the $N_i$ second reference signals, where i is an integer greater than or equal to 1 and less than or equal to L, $N_i$ is an integer greater than or equal to 1, and the resource for the second reference signal is used to measure interference. For other detailed explanations of the first reference signal resource set, the L second reference signal resource sets, and the type of the first reference signal resource set, refer to the descriptions in S501. Details are not described herein again in this embodiment of this application. Then, the network device acquires the first signal power and the second signal power. The first signal power is a signal power of a first reference signal carried on the resource for the $j^{th}$ first reference signal, and the second signal power is a signal power of the second reference signal carried on the resource that is for the second reference signal and that corresponds to the resource for the $j^{th}$ first reference signal. The signal to interference plus noise ratio is determined based on the first signal power and the second signal power. Finally, M signal powers may be acquired for the resources for the M first reference signals, and the M signal powers may be used as the channel state information. For a detailed explanation of determining the signal to interference plus noise ratio, refer to the descriptions in S503. Details are not described herein again in this embodiment of this application.

Alternatively, the network device may preconfigure the first reference signal resource set, the L second reference signal resource sets, and the information about the spatial correlation parameter. For other detailed explanations of the first reference signal resource set, the L second reference signal resource sets, and the information about the spatial correlation parameter, refer to the descriptions in S1101. Details are not described herein again in this embodiment of this application. Then, the network device acquires the first signal power and the second signal power. The first signal power is a signal power of a first reference signal carried on the resource for the $j^{th}$ first reference signal, and the second signal power is a signal power of the second reference signal carried on the resource that is for the second reference signal and that corresponds to the resource for the $j^{th}$ first reference signal. The signal to interference plus noise ratio is determined based on the first signal power and the second signal power. Finally, M signal powers may be acquired for the resources for the M first reference signals, and the M signal powers may be used as the channel state information. Fax a detailed explanation of determining the signal to interference plus noise ratio, refer to the descriptions in S1103. Details are not described herein again in this embodiment of this application.

In the foregoing embodiments provided in this application, the methods provided in the embodiments of this application are separately described from perspectives of the network device, the terminal device, and interaction between the network device and the terminal device. It may be understood that, to implement the functions in the methods provided in the embodiments of this application, the network elements such as the network device and the terminal device include corresponding hardware structures and/or software modules for performing the functions. A person skilled in the art should be easily aware that, in combination with the examples described in the embodiments disclosed in this specification, algorithm steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the network device and the terminal device based on the foregoing method example. For example, each function module may be acquired through division corresponding to each function, or two or more functions may be integrated in one processing module. The integrated module may be implemented in a form of hardware, or may be implemented in a form of a software function module. It should be noted that, in the embodiments of this application, division into the modules is an example, and is merely logical function division. During actual implementation, another division manner may be used.

Figure 12:
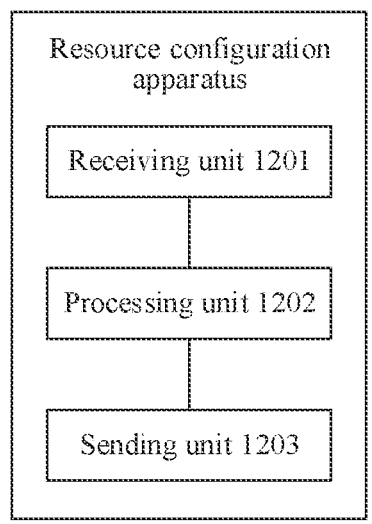
FIG. 12 is a schematic composition diagram of a resource indication apparatus according to an embodiment of this application.

When each function module is acquired through division corresponding to each function, FIG. 12 is a possible composition schematic diagram of the resource indication apparatus in the foregoing embodiments. The resource indication apparatus can perform the steps performed by the network device or the terminal device in any one of the method embodiments of this application. As shown in FIG. 12, the resource indication apparatus is a terminal device or a communication apparatus that supports a terminal device in implementing the methods provided in the embodiments. For example, the communication apparatus may be a chip system, or the resource indication apparatus is a network device or a communication apparatus that supports a network device in implementing the methods provided in the embodiments. For example, the communication apparatus may be a chip system. The resource indication apparatus may include a receiving unit 1201, a processing unit 1202, and a sending unit 1203.

For example, if the resource indication apparatus is the terminal device or the communication apparatus that supports the terminal device in implementing the methods provided in the embodiments, the receiving unit 1201 is configured to perform or support the resource indication apparatus in performing S502 in the resource indication method shown in FIG. 5 and S1102 in the resource indication method shown in FIG. 11, The processing unit 1202 is configured to perform or support the resource indication apparatus in performing S503 in the resource indication method shown in FIG. 5 and S1103 in the resource indication method shown in FIG. 11. The sending unit 1203 is configured to perform or support the resource indication apparatus in performing S504 in the resource indication method shown in FIG. 5 and S1104 in the resource indication method shown in FIG. 11.

If the resource indication apparatus is the network device or the communication apparatus that supports the network device in implementing the methods provided in the embodiments, the receiving unit 1201 is configured to perform or support the resource indication apparatus in performing S505 in the resource indication method shown in FIG. 5 and S1105 in the resource indication method shown in FIG. 11. The sending unit 1203 is configured to perform or support the resource indication apparatus in performing S501 in the resource indication method shown in FIG. 5 and S1101 in the resource indication method shown in FIG. 11.

It should be noted that all related content of the steps in the foregoing method embodiments may be cited in function descriptions of corresponding function modules. Details are not described herein again.

The paging processing apparatus provided in this embodiment of this application is configured to perform the method in any one of the foregoing embodiments, and therefore can achieve a same effect as the methods in the foregoing embodiments.

Figure 13:
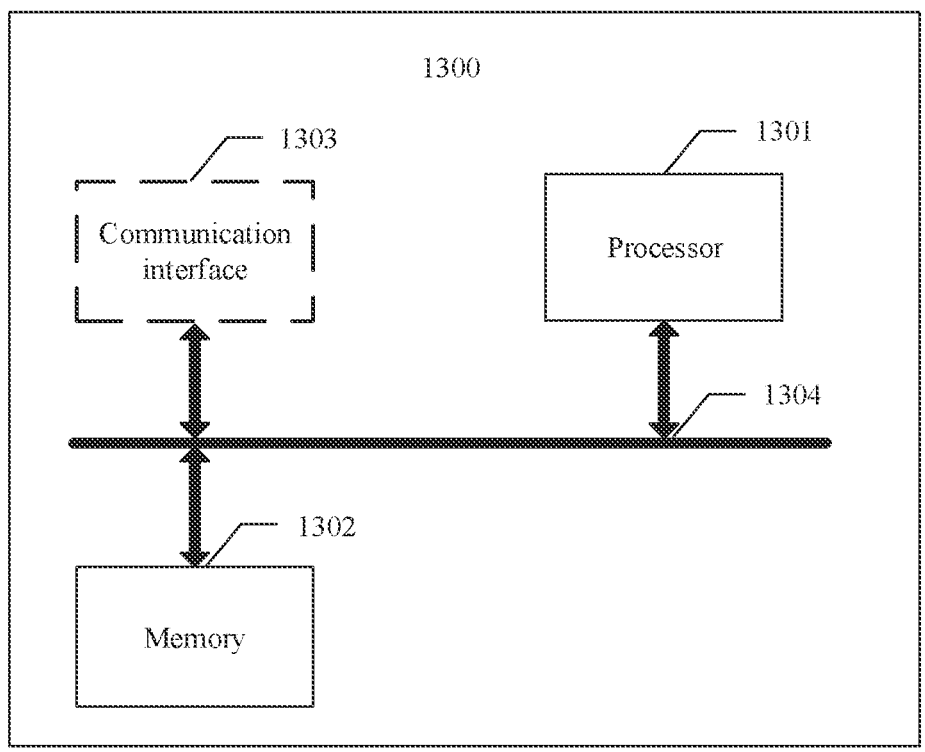
FIG. 13 is a schematic composition diagram of a communication apparatus according to an embodiment of this application.

FIG. 13 shows a communication apparatus 1300 according to an embodiment of this application. The communication apparatus 1300 is configured to implement functions of the network device in the foregoing methods. The communication apparatus 1300 may be a network device, or may be an apparatus in a network device. The communication apparatus 1300 may be a chip system. In this embodiment of this application, the chip system may include a chip, or may include a chip and another discrete component. Alternatively, the communication apparatus 1300 is configured to implement functions of the terminal device in the foregoing methods. The communication apparatus 1300 may be a terminal device, or may be an apparatus in a terminal device. The communication apparatus 1300 may be a chip system. In this embodiment of this application, the chip system may include a chip, or may include a chip and another discrete component.

The communication apparatus 1300 includes at least one processor 1301, configured to implement functions of the network device or the terminal device in the methods provided in the embodiments of this application. For example, the processor 1301 may be configured to determine channel state information based on a resource for a $j^{th}$ first reference signal and a resource that is for a second reference signal and that corresponds to the resource for the $j^{th}$ first reference signal, and so on. For details, refer to detailed descriptions in the method examples. Details are not described herein.

The communication apparatus 1300 may further include at least one memory 1302, configured to store a program instruction and/or data. The memory 1302 is coupled to the processor 1301. Coupling in this embodiment of this application may be indirect coupling or a communication connection between apparatuses, units, or modules in an electrical form, a mechanical form, or another form, and is used for information exchange between the apparatuses, the units, or the modules. The processor 1301 may operate with the memory 1302. The processor 1301 may execute the program instruction stored in the memory 1302. At least one of the at least one memory may be included in the processor.

The communication apparatus 1300 may further include a communication interface 1303, configured to communicate with another device through a transmission medium, so that an apparatus in the communication apparatus 1300 can communicate with the another device. For example, if the communication apparatus is the network device, the another device is a terminal device. If the communication apparatus is the terminal device, the another device is a network device. The processor 1301 sends and receives data by using the communication interface 1303, and is configured to implement the method performed by the network de the terminal device in the embodiment corresponding to FIG. 5.

In this embodiment of this application, a specific connection medium between the communication interface 1303, the processor 1301, and the memory 1302 is not limited. In this embodiment of this application, in FIG. 13, the communication interface 1303, the processor 1301, and the memory 1302 are connected through a bus 1304. The bus is represented by using a thick line in FIG. 13. A connection manner between other components is merely an example for description, and constitutes no limitation. The bus may be classified into an address bus, a data bus, a control bus, and the like. For ease of representation, only one thick line is used to represent the bus in FIG. 13, but this does not mean that there is only one bus or only one type of bus.

In this embodiment of this application, the processor may be a general purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor, any conventional processor, or the like. The steps in the methods disclosed with reference to the embodiments of this application maw be directly performed and completed by a hardware processor, or may be performed and completed by a combination of hardware in the processor and a software module.

In the embodiments of this application, the memory may be a nonvolatile memory such as a hard disk drive (hard disk drive, HDD) or a solid-state drive (solid-state drive, SSD), or may be a volatile memory (volatile memory) such as a random-access memory (random-access memory, RAM). The memory is any other medium that can be used to carry or store expected program code in a form of an instruction or a data structure and that can be accessed by a computer. However, this is not limited thereto. The memory in the embodiments of this application may alternatively, be a circuit or any other apparatus that can implement a storage function, and is configured to store a program instruction and/or data.

By using the foregoing descriptions of the implementations, a person skilled in the art may clearly understand that, for the purpose of convenient and brief description, division into the foregoing function modules is used as an example for description. During actual application, the foregoing functions may be allocated to different function modules and implemented based on a requirement. That is, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division. There may be another division manner during actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may be one or more physical units, that is, may be located in one place, or may be distributed on a plurality of different places. Some or all of the units may be selected based on actual requirements to achieve the objective of the solutions of the embodiments.

In addition, functional units in the embodiments of this application may be integrated into one processing unit, each of the units may exist alone physically, or two or more units are integrated into one unit. The integrated unit may be implemented in a form of hardware, or may be implemented in a form of a software function unit.

All or some of the foregoing methods in the embodiments of this application may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are completely or partially generated. The computer may be a general-purpose computer, a special-purpose computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc. DVD)), a semiconductor medium (for example, an SSD), or the like.

The foregoing descriptions are merely specific implementations of this application, but the protection scope of this application is limited thereto. Any variation or replacement within the technical scope disclosed in this application shall fall within the protection scope of this application, Therefore, the protection scope of this application shall be subject to the protection scope of the claims.

What is claimed is:

1. A resource indication method, comprising:
receiving resource configuration information, wherein the resource configuration information is used to indicate a first reference signal resource set, L second reference signal resource sets, and a type of the first reference signal resource set, wherein the first reference signal resource set comprises resources for M first reference signals, wherein a resource for one of the M first reference signals is used to measure a channel, wherein an $i^{th}$ second reference signal resource set comprises resources for $N_i$ second reference signals, wherein a resource for one of the $N_i$ second reference signals is used to measure interference, wherein M is an integer greater than 1, wherein L is an integer greater than or equal to 1, wherein i is an integer greater than or equal to 1 and less than or equal to L, and wherein $N_i$ is an integer greater than or equal to 1; and
in response to receiving the resource configuration information:
determining channel state information based on a resource for a $j^{th}$ first reference signal and a resource that is for a second reference signal and that corresponds to the resource for the $j^{th}$ first reference signal, wherein j is an integer greater than or equal to 1 and less than or equal to M; and
sending the channel state information.

2. The method according to claim 1, wherein the resource that is for the second reference signal and that corresponds to the resource for the $j^{th}$ first reference signal is determined based on the type of the first reference signal resource set.

3. The method according to claim 1, wherein the resource that is for the second reference signal and that corresponds to the resource for the $j^{th}$ first reference signal is a resource that is for a second reference signal and that meets a quasi co-location (QCL) relationship with the resource for the $j^{th}$ first reference signal.

4. The method according to claim 1, wherein the resource that is for the second reference signal and that corresponds to the resource for the $j^{th}$ first reference signal is a reported resource that is for a second reference signal and that meets a quasi co-location (QCL) relationship with the resource for the $j^{th}$ first reference signal.

5. The method according to claim 1, wherein the type of the first reference signal resource set comprises a first type and a second type, wherein the first type is used to indicate that the M first reference signals use different downlink spatial transmission filters, and wherein the second type is used to indicate that the M first reference signals use a same downlink spatial transmission filter.

6. A resource indication method, comprising:
sending resource configuration information, wherein the resource configuration information is used to indicate a first reference signal resource set, L second reference signal resource sets, and a type of the first reference signal resource set, wherein the first reference signal resource set comprises resources for M first reference signals, wherein a resource for one of the M first reference signals is used to measure a channel, wherein an $i^{th}$ second reference signal resource set comprises resources for $N_i$ second reference signals, wherein a resource for one of the $N_i$ second reference signals is used to measure interference, wherein M is an integer greater than 1, wherein L is an integer greater than or equal to 1, wherein i is an integer greater than or equal to 1 and less than or equal to L, and wherein $N_i$ is an integer greater than or equal to 1; and in response to sending the resource configuration information, receiving channel state information, wherein the channel state information is determined based on a resource for a $j^{th}$ first reference signal and a resource that is for a second reference signal and that corresponds to the resource for the $j^{th}$ first reference signal, and wherein j is an integer greater than or equal to 1 and less than or equal to M.

7. The method according to claim 6, wherein the resource that is for the second reference signal and that corresponds to the resource for the $j^{th}$ first reference signal is determined based on the type of the first reference signal resource set.

8. The method according to claim 6, wherein the resource that is for the second reference signal and that corresponds to the resource for the $j^{th}$ first reference signal is a resource that is for a second reference signal and that meets a quasi co-location (QCL) relationship with the resource for the $j^{th}$ first reference signal.

9. The method according to claim 6, wherein the resource that is for the second reference signal and that corresponds to the resource for the $j^{th}$ first reference signal is a resource that corresponds to a received resource index of a second reference signal and that meets a quasi co-location (QCL) relationship with the resource for the $j^{th}$ first reference signal.

10. The method according to claim 6, wherein the type of the first reference signal resource set comprises a first type and a second type, wherein the first type is used to indicate that the M first reference signals use different downlink spatial transmission filters, and wherein the second type is used to indicate that the M first reference signals use a same downlink spatial transmission filter.

11. A resource indication apparatus, comprising:
a receiver, the receiver configured to receive resource configuration information, wherein the resource configuration information is used to indicate a first reference signal resource set, L second reference signal resource sets, and a type of the first reference signal resource set, wherein the first reference signal resource set comprises resources for M first reference signals, wherein a resource for one of the M first reference signals is used to measure a channel, wherein an $i^{th}$ second reference signal resource set comprises resources for $N_i$ second reference signals, wherein a resource for one of the $N_i$ second reference signals is used to measure interference, wherein M is an integer greater than 1, wherein L is an integer greater than or equal to 1, wherein i is an integer greater than or equal to 1 and less than or equal to L, and wherein $N_i$ is an integer greater than or equal to 1;
at least one processor;
one or more memories coupled to the at least one processor and storing programming instructions for execution by the at least one processor to determine, in response to receiving the resource configuration information, channel state information based on a resource for a $j^{th}$ first reference signal and a resource that is for a second reference signal and that corresponds to the resource for the $j^{th}$ first reference signal, wherein j is an integer greater than or equal to 1 and less than or equal to M; and
a transmitter, the transmitter configured to send the channel state information.

12. The apparatus according to claim 11, wherein the resource that is for the second reference signal and that corresponds to the resource for the $j^{th}$ first reference signal is determined based on the type of the first reference signal resource set.

13. The apparatus according to claim 11, wherein the resource that is for the second reference signal and that corresponds to the resource for the $j^{th}$ first reference signal is a resource that is for a second reference signal and that meets a quasi co-location (QCL) relationship with the resource for the $j^{th}$ first reference signal.

14. The apparatus according to claim 11, wherein the resource that is for the second reference signal and that corresponds to the resource for the $j^{th}$ first reference signal is a reported resource that is for a second reference signal and that meets a quasi co-location (QCL) relationship with the resource for the $j^{th}$ first reference signal.

15. The apparatus according to claim 11, wherein the type of the first reference signal resource set comprises a first type and a second type, wherein the first type is used to indicate that the M first reference signals use different downlink spatial transmission filters, and wherein the second type is used to indicate that the M first reference signals use a same downlink spatial transmission filter.

16. A resource indication apparatus, comprising:
a transmitter, the transmitter configured to send resource configuration information, wherein the resource configuration information is used to indicate a first reference signal resource set, L second reference signal resource sets, and a type of the first reference signal resource set, wherein the first reference signal resource set comprises resources for M first reference signals, wherein a resource for one of the M first reference signals is used to measure a channel, wherein an $i^{th}$ second reference signal resource set comprises resources for $N_i$ second reference signals, wherein a resource for one of the $N_i$ second reference signals is used to measure interference, wherein M is an integer greater than 1, wherein L is an integer greater than or equal to 1, wherein i is an integer greater than or equal to 1 and less than or equal to L, and wherein $N_i$ is an integer greater than or equal to 1; and
a receiver, the receiver configured to receive, in response to sending the resource configuration information, channel state information, wherein the channel state information is determined based on a resource for a $j^{th}$ first reference signal and a resource that is for a second reference signal and that corresponds to the resource for the $j^{th}$ first reference signal, and wherein j is an integer greater than or equal to 1 and less than or equal to M.

17. The apparatus according to claim 16, wherein the resource that is for the second reference signal and that corresponds to the resource for the $j^{th}$ first reference signal is determined based on the type of the first reference signal resource set.

18. The apparatus according to claim 16, wherein the resource that is for the second reference signal and that corresponds to the resource for the $j^{th}$ first reference signal is a resource that is for a second reference signal and that meets a quasi co-location (QCL) relationship with the resource for the $j^{th}$ first reference signal.

19. The apparatus according to claim 16, wherein the resource that is for the second reference signal and that corresponds to the resource for the $j^{th}$ first reference signal is a resource that corresponds to a received resource index of a second reference signal and that meets a quasi co-location (QCL) relationship with the resource for the $j^{th}$ first reference signal.

20. The apparatus according to claim 16, wherein the type of the first reference signal resource set comprises a first type and a second type, wherein the first type is used to indicate that the M first reference signals use different downlink spatial transmission filters, and wherein the second type is used to indicate that the M first reference signals use a same downlink spatial transmission filter.

21. A resource indication apparatus, comprising:
at least one processor;
a bus;
a sensor; and
one or more memories coupled to the at least one processor and storing programming instructions for execution by the at least one processor to perform operations comprising:
receiving resource configuration information, wherein the resource configuration information is used to indicate a first reference signal resource set, L second reference signal resource sets, and a type of the first reference signal resource set, wherein the first reference signal resource set comprises resources for M first reference signals, wherein a resource for one of the M first reference signals is used to measure a channel, wherein an $i^{th}$ second reference signal resource set comprises resources for $N_i$ second reference signals, wherein a resource for one of the $N_i$ second reference signals is used to measure interference, wherein M is an integer greater than 1, wherein L is an integer greater than or equal to 1, wherein i is an integer greater than or equal to 1 and less than or equal to L, and wherein $N_i$ is an integer greater than or equal to 1; and
in response to receiving the resource configuration information:
determining channel state information based on a resource for a $j^{th}$ first reference signal and a resource that is for a second reference signal and that corresponds to the resource for the $j^{th}$ first reference signal, wherein j is an integer greater than or equal to 1 and less than or equal to M; and
sending the channel state information.

22. A non-transitory computer-readable storage medium, comprising instructions which, when executed by one or more processors in a resource indication apparatus or a chip built in the resource indication apparatus, cause the resource indication apparatus to perform operations comprising:
receiving resource configuration information, wherein the resource configuration information is used to indicate a first reference signal resource set, L second reference signal resource sets, and a type of the first reference signal resource set, wherein the first reference signal resource set comprises resources for M first reference signals, wherein a resource for one of the M first reference signals is used to measure a channel, wherein an $i^{th}$ second reference signal resource set comprises resources for $N_i$ second reference signals, wherein a resource for one of the $N_i$ second reference signals is used to measure interference, wherein M is an integer greater than 1, wherein L is an integer greater than or equal to 1, wherein i is an integer greater than or equal to 1 and less than or equal to L, and wherein N is an integer greater than or equal to 1; and
in response to receiving the resource configuration information:
determining channel state information based on a resource for a $j^{th}$ first reference signal and a resource that is for a second reference signal and that corresponds to the resource for the $j^{th}$ first reference signal, wherein j is an integer greater than or equal to 1 and less than or equal to M; and
sending the channel state information.

* * * * *

UNITED STATES PATENT AND TRADEMARK OFFICE
CERTIFICATE OF CORRECTION

PATENT NO. : 12,150,155 B2
APPLICATION NO. : 17/370506
DATED : November 19, 2024
INVENTOR(S) : Di Zhang, Kunpeng Liu and Yongxing Zhou Page 1 of 1

It is certified that error appears in the above-identified patent and that said Letters Patent is hereby corrected as shown below:

In the Claims

In Column 56, In Line 25, In Claim 22, delete "N" and insert -- $N_i$ --.

Signed and Sealed this
Fourth Day of March, 2025

Coke Morgan Stewart
*Acting Director of the United States Patent and Trademark Office*